(12) United States Patent
McGovern, Jr.

(10) Patent No.: US 11,209,133 B1
(45) Date of Patent: Dec. 28, 2021

(54) FLASHLIGHT

(71) Applicant: Roy Burke McGovern, Jr., Corning, NY (US)

(72) Inventor: Roy Burke McGovern, Jr., Corning, NY (US)

( * ) Notice: Subject to any disclaimer, the term of this patent is extended or adjusted under 35 U.S.C. 154(b) by 0 days.

(21) Appl. No.: 17/281,204

(22) PCT Filed: Jun. 5, 2020

(86) PCT No.: PCT/US2020/036483
§ 371 (c)(1),
(2) Date: Mar. 29, 2021

(87) PCT Pub. No.: WO2020/247861
PCT Pub. Date: Dec. 10, 2020

Related U.S. Application Data

(60) Provisional application No. 62/858,292, filed on Jun. 6, 2019.

(51) Int. Cl.
| | | |
|---|---|---|
| F21L 4/02 | (2006.01) | |
| F21V 5/00 | (2018.01) | |
| F21V 7/00 | (2006.01) | |
| F21Y 115/10 | (2016.01) | |

(52) U.S. Cl.
CPC .............. *F21L 4/027* (2013.01); *F21V 5/007* (2013.01); *F21V 7/0075* (2013.01); *F21L 4/02* (2013.01); *F21Y 2115/10* (2016.08)

(58) Field of Classification Search
CPC .. F21L 4/02; F21L 4/027; F21V 5/007; F21V 7/0075

USPC ....... 362/184, 237, 240, 241, 244, 245, 247, 362/249.02
See application file for complete search history.

(56) References Cited

U.S. PATENT DOCUMENTS

| 5,174,649 | A | 12/1992 | Alston | |
|---|---|---|---|---|
| 8,070,315 | B2 * | 12/2011 | Schroll | ..................... F21K 9/69 362/243 |
| 9,022,601 | B2 * | 5/2015 | Lu | ........................ G02B 5/0215 362/237 |
| 2003/0076690 | A1 * | 4/2003 | Takahashi | ............... F21S 43/40 362/545 |
| 2006/0082321 | A1 | 4/2006 | Van Deursen | |
| 2007/0258235 | A1 | 11/2007 | Brockel | |
| 2008/0180032 | A1 | 7/2008 | Kim | |
| 2010/0182777 | A1 * | 7/2010 | Van Deursen | ............ F21L 4/04 362/184 |
| 2010/0277696 | A1 | 11/2010 | Huebner | |

(Continued)

OTHER PUBLICATIONS

International Search Report dated Oct. 6, 2020 in PCT/US2020/036483 (1 page).

(Continued)

*Primary Examiner* — Laura K Tso

(57) ABSTRACT

A rectangular wide-beam flashlight that utilizes a plurality of LEDs positioned in specifically formed optical elements to generate a uniform, rectangular beam pattern configured to substantially illuminate one or more walls in a room. The flashlight uses a radial array of LEDs that are disposed at or within optical elements or cavities configured to combine the output of the LEDs to form a substantially uniform and seamless, high-aspect ratio or wide rectangular beam for adequately illuminating one or more walls in a room.

14 Claims, 15 Drawing Sheets

(56) References Cited

U.S. PATENT DOCUMENTS

| | | |
|---|---|---|
| 2011/0215696 A1 | 9/2011 | Tong |
| 2012/0120662 A1 | 5/2012 | Duong |
| 2014/0321107 A1* | 10/2014 | Namors ................. F21V 13/08 362/184 |

OTHER PUBLICATIONS

International Written Opinion dated Oct. 16, 2020 in PCT/US2020/036483 (12 pages).

* cited by examiner

FLASHLIGHT

CROSS-REFERENCE TO RELATED APPLICATIONS

This application claims priority to, and the benefit of, international application PCT/US2020/036483 filed on Jun. 5, 2020, which claims priority to U.S. provisional patent application Ser. No. 62/858,292 filed on Jun. 6, 2019, both of which are incorporated herein by reference in their entireties.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to an illumination apparatus, and more particularly to a flashlight with a rectangular beam pattern.

2. Background Discussion

Generally, existing flashlights generate a circular, focused beam pattern that results in uneven dispersion in the form of a high intensity spot and much larger low-intensity spill pattern.

A significant need exists for the ability to illuminate one or more walls of a room with a uniform beam pattern that fills one or more wall surfaces. Existing systems fail to provide a uniform rectangular beam pattern for achieving such illumination.

BRIEF SUMMARY

An aspect of the present description is a rectangular wide-beam flashlight that utilizes a plurality of LEDs positioned in uniquely formed optical elements to generate a uniform, rectangular beam pattern configured to substantially illuminate one or more walls in a room.

In one embodiment, the flashlight uses a sequential array of LEDs that are radially disposed at or within optical elements or cavities configured to combine the output of the LEDs to form a substantially uniform and seamless, high-aspect ratio or wide rectangular beam for adequately illuminating one or more walls in a room.

In a further embodiment, the array of LEDs are disposed in a circular array that forms a combined angular swath greater than 180 degrees, and the beams from neighboring LEDs are configured to overlap so as not to provide black spots within the illumination beam. The optical elements may also be configured to taper the luminous intensity of respective beams at lateral fringes of beam where overlap may occur to blend or fuse the beams at the overlap locations.

In another embodiment, the wide-beam flashlight comprises a pair of retractable legs that may be extended from the flashlight housing to allow the flashlight to be propped up in a "hands-free" configuration.

The flashlight may also comprise logic components and a switch for selective control of each LED in the array of LEDs to provide varying beam widths or illumination patterns, and strobe option for dynamic illumination at a set frequency (e.g. flash mode).

Further aspects of the technology described herein will be brought out in the following portions of the specification, wherein the detailed description is for the purpose of fully disclosing embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
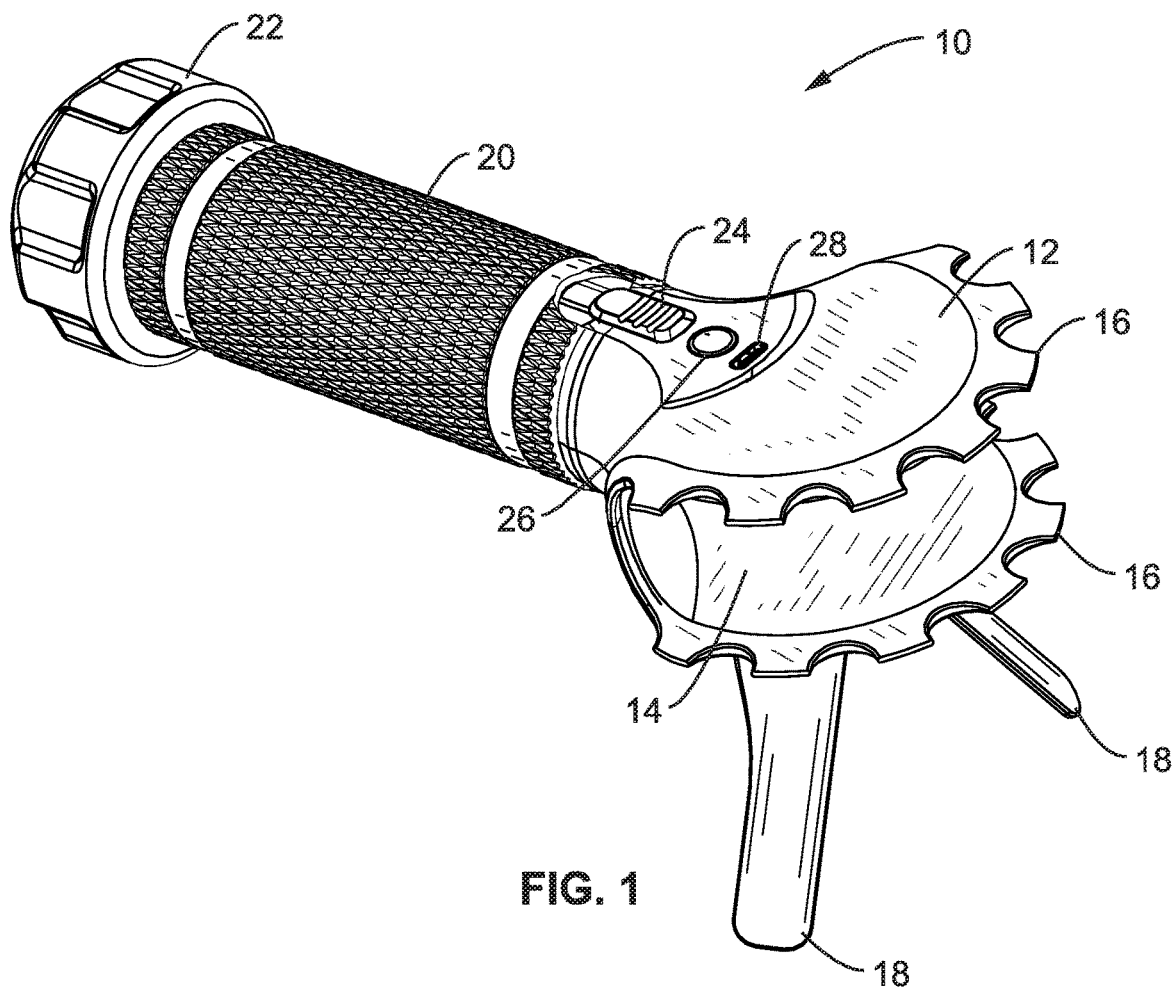
FIG. 1 is a perspective view of a rectangular wide-beam flashlight with legs forming a bipod structure in an extended configuration in accordance with the present disclosure.

FIG. 1 through FIG. 5 show various views of a rectangular wide-beam flashlight 10 in accordance with the present disclosure. Flashlight 10 comprises a housing having a first end forming a battery compartment 20 The battery compartment 20 comprises a cavity (not shown) that is configured to house a portable power source such as a battery or rechargeable batteries (not shown) and also acts as the handle for holding the flashlight. A tail cap 22 releasably attaches to the rear end of the battery compartment 20 e.g. so that it can be removed to allow access to the battery compartment to change the batteries. An optical head 12 is disposed at the second end of the housing opposite the battery compartment 20 and houses optical components (see FIG. 4 and FIG. 5), switch 24, strobe button 26, charging/communication port 28 (e.g. micro-USB or the like), toothed or serrated forward edges 16, cover/lens 14 and retractable legs 18.

Figure 2:
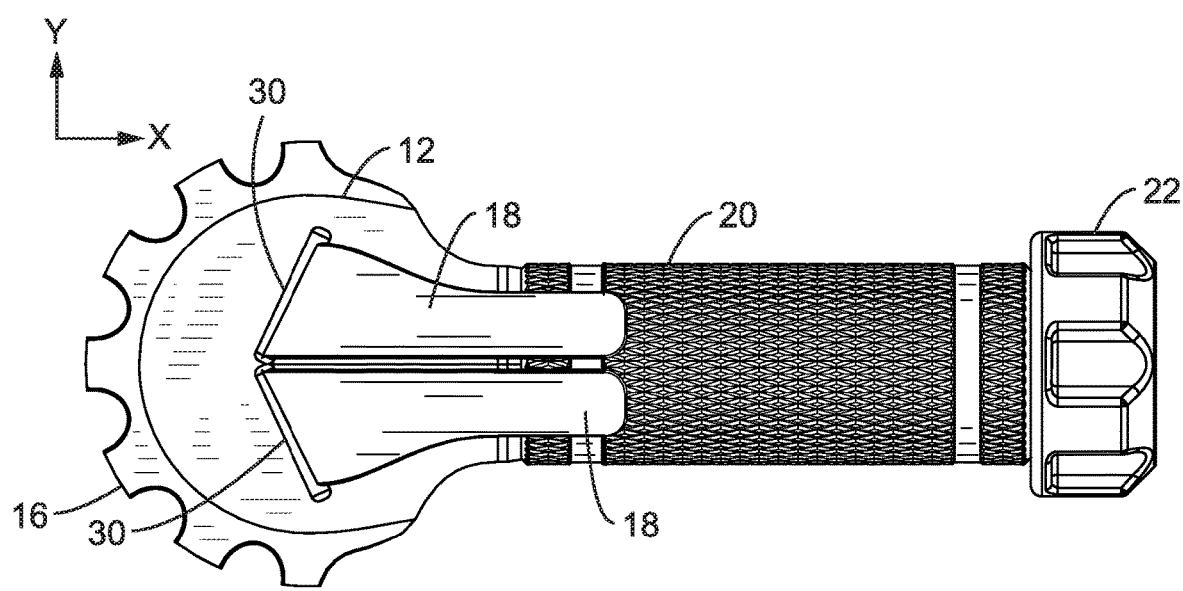
FIG. 2 is a bottom view of the rectangular wide-beam flashlight of FIG. 1 with legs in a collapsed or retracted configuration.
Figure 3:
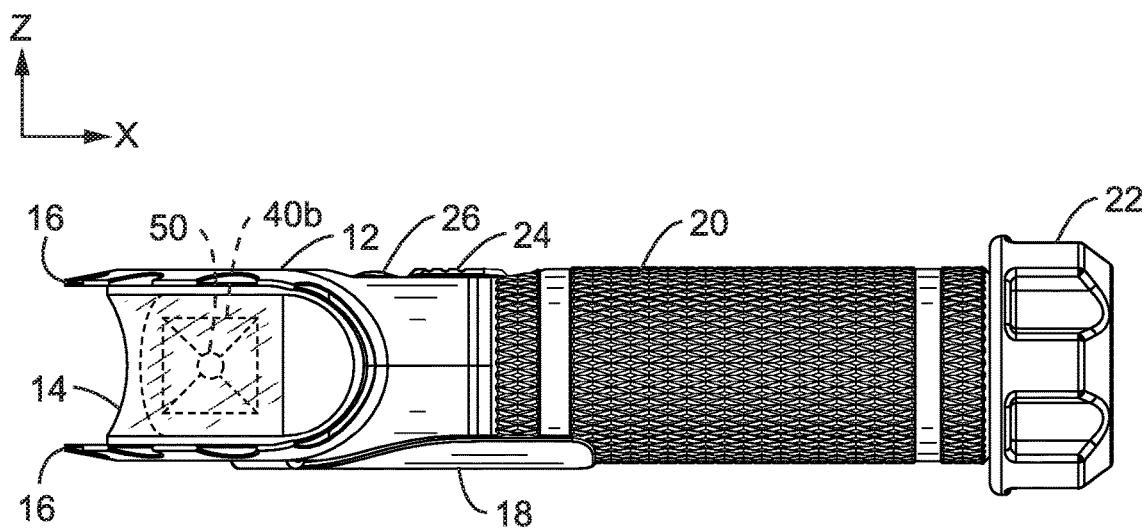
FIG. 3 is a side view of the rectangular wide-beam flashlight of FIG. 1 with legs in a collapsed or retracted configuration.

FIG. 1 shows the legs 18 legs in an extended configuration. FIG. 2 and FIG. 3 show the legs 18 in a collapsed or retracted configuration via rotation of the legs toward the battery compartment 20. The legs 18 form a bipod structure (which may also be one continuous piece—not shown) that form two feet when the legs are deployed to use the flashlight 10 hands-free to illuminate a specific area for a period of time. The legs 18 attach to the lower, flat surface of the optical head 12 with via hinges 30 located on the bottom surface of the optical head. The legs 18 are stored against the side or bottom of the flashlight (FIG. 2 and FIG. 3) when they are not in use and open forwards and outwards when they are deployed (FIG. 1). When deployed, the two feet of the legs 18 and point contact of the tail cap 22 at the end of the battery compartment 20 form a tripod structure that points the optical head slightly upward from the surface upon which it is disposed. A stop (not shown) may be incorporated into the hinge 30 or the optical head 12 in order to limit the travel of the legs 18 so they are stable when supporting the flashlight. The legs 18 are hinged such that they fold outward in opposite directions and when at full extension are positioned over center to prevent them from collapsing under the weight of the flashlight 10. When the legs 18 are in the closed position, they are held in place by friction in the hinge 30 or by an interference snap feature or detent (not shown) incorporated into the optical head 12 of the flashlight. The distal end of each leg is configured to rest on the ground or other surface when the flashlight is used in "hands free" mode. In one embodiment, the hinge 30 comprises a clevis hinge.

The cover/lens 14 is configured to provide protection to the optical components and may comprise a clear arcuate cover that wraps around the front end of the optical head 12. The cover/lens 14 may be sealed between the upper surface and the lower surface of the optical head 12 with a rubber gasket (not shown). The cover/lens 14 is preferably disposed in a convex shape to reduce the likelihood that the lens will break if the flashlight is inadvertently dropped on the ground and strikes a rock. Cover/lens 14 may be shaped to provide certain optical qualities. For example, the lens 14 may have an hourglass-shaped cross-section (FIG. 3) to provide vertical collimation, or other optical/dispersion characteristic to the emitted flashlight beam. The forward edges 16 of the optical head 12 protrudes farther in front of the cover/lens and provides additional protection to the lens against breakage. The forward edges 16 are preferably serrated so that it can be used as a weapon in the event that the flashlight user is being attacked.

The tail cap 22 is preferably attached to the battery compartment 20 via threads on both pieces and is sealed to prevent water leakage into the battery compartment with a rubber O-ring (not shown) that fits between the tail cap and the battery compartment. The tail cap 22 is preferably larger in diameter than the battery compartment 20, which helps to prevent the flashlight from slipping out of the user's hand, and also helps to form a contact surface to form a 3-point or tripod structure with the extended legs 18.

The battery compartment 20, optical head 12 and tail cap 22 of the flashlight 10 are preferably made out of aluminum, but may also be made out of plastic or steel. The optical head 12 may be made as a single part or made out of two shells that are fastened together with screws (not shown) connecting them. Rubber gaskets (not shown) may be used to seal all joints of the housing to prevent leakage of water.

Figure 4:
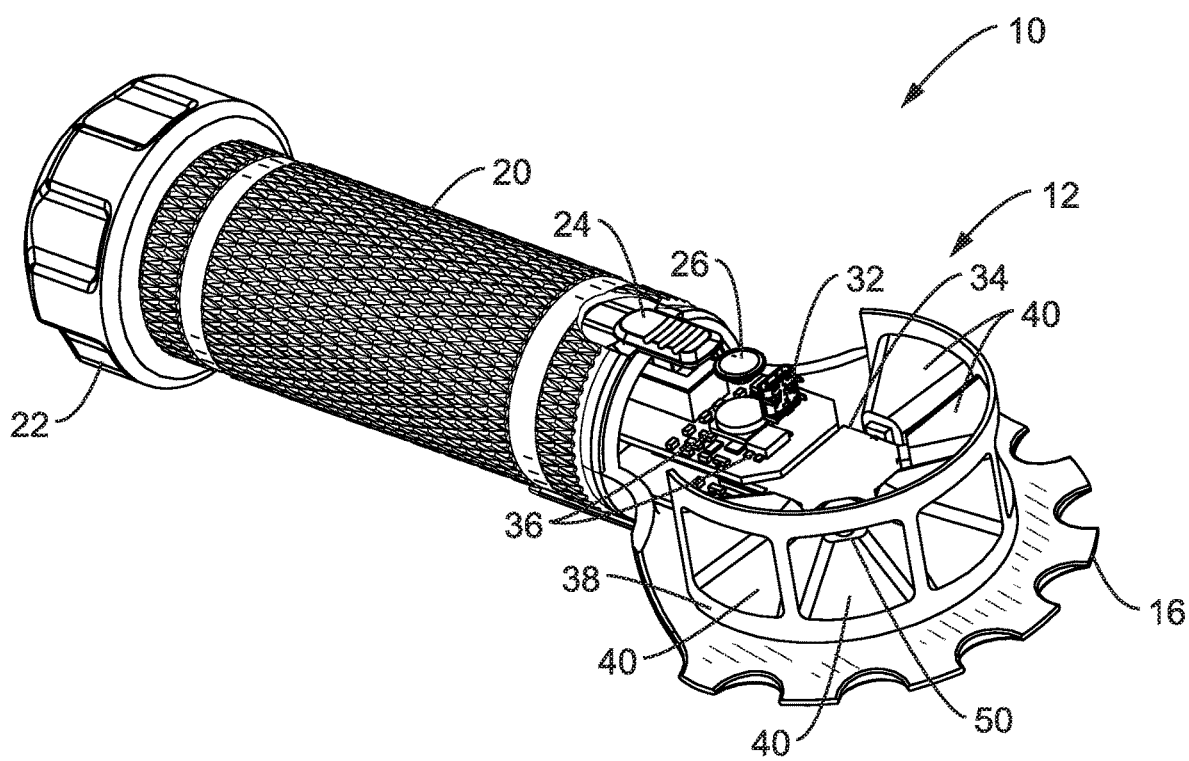
FIG. 4 is a perspective view of the rectangular wide-beam flashlight of FIG. 1 with top cover and lens removed and legs in a collapsed or retracted configuration.

FIG. 4 shows a perspective view of the rectangular wide-beam flashlight 10 with top cover and lens 14 removed to illustrate the components therein. This embodiment of the rectangular wide-beam flashlight 10 shows a configuration with five light sources 50 sequentially disposed in a radial array. In one embodiment, the light sources comprise high-power light emitting diodes (LEDs). While a 5-LED array is shown and described, it will be appreciated that the array may range from 2 to 7 or more LEDs. Each LED 50 is disposed on a mounting bracket 34 at the end of a circuit board 32, which is coupled to the switch 24, strobe button 26, charging/communication port 28 and associated logic components 36. Each LED 50 is positioned inside or adjacent a dedicated optical element 40 that is configured to direct and/or shape light emitted from the LEDs to generate the desired beam pattern. In the embodiment shown in FIG. 4 and FIG. 5, the optical elements 40 are configured as diverging reflectors shaped to form a rectangular pattern when illuminating a planar surface. The distal ends of the optical elements 40 are secured to a circular-shaped bracket 38 that has one or more windows for allowing transmission of light. The optical elements 40 may be made out of polished metal, glass, plastic, and may have a reflective coating.

While LEDs 50 may comprise any type of light source, in one embodiment they comprise high-power LEDs (e.g. 1000 lumen Cree LEDs). In one embodiment, the optical elements 40 are sized to be approximately 1.3 inches in length, with a width at the proximal end (at the LED 50) being approximately ⅓ the width at the distal end.

Figure 5:
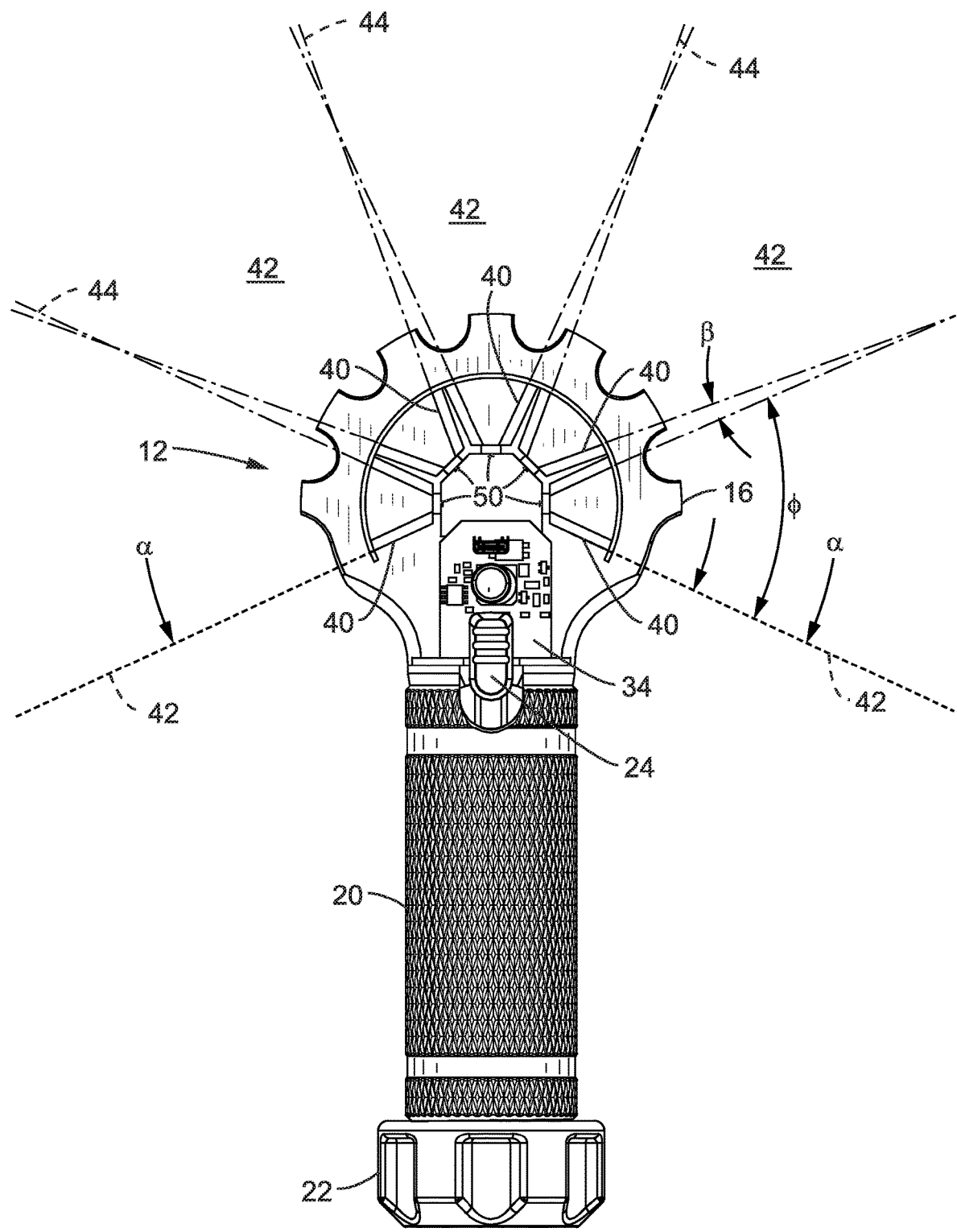
FIG. 5 is a top view of the rectangular wide-beam flashlight of the configuration shown in FIG. 4.

FIG. 5 is a top view of the rectangular wide-beam flashlight 10, illustrating the resulting beam pattern. Each LED 50 emits a dedicated beam 42, having an angular dispersion Φ in the X-Y plane, as shaped by the respective optical element 40. So as not to create dark spots, and to alleviate need for perfect alignment of LEDs 50 and/or optical elements 40, the LEDs 50 and optical elements 40 are aligned/shaped so that each of the beams 42 has a slight overlap 44 at an angle β. The individual beams 42 form a solid angular swath α in the X-Y plane of the flashlight 10.

In the embodiment shown in FIG. 1 through FIG. 5 for a 5-LED array, the sliding switch 24 has 4 positions programmed within the logic components 36 for variable illumination of the LED array. In the first position, the power to all of the LEDs is off. In the second position, only the power to the front (center-most) LED is on. In the third position, the power to the front LED is on along with the power to each LED adjacent to the front LED. In the fourth position all 5 LEDs are powered on. It is appreciated that the switch 24 and/or logic components 36 may comprise different functionality to provide a number of various illumination patterns. For example, the lights may be selectively operated (e.g. via switch 24 or additional switches/buttons not shown) to provide "side-only" illumination where one or more central beams are turned off while left and right side beams are on, essentially straddling a forward region deliberately kept dark with two spaced-apart illumination regions. Therefore, it will be appreciated various switch configurations and functions can be employed without limitation, including but not limited to off/on/dimmable thumb control functions and slide and/or rotary configurations.

The strobe button 26 is located forward of the sliding switch 24 and may be programmed to activate all of the LEDs simultaneously with the right facing and left facing LEDs in strobe "flash bang" mode.

The USB connector 28 is located forward of the strobe button 26. The primary function of the USB connector 28 is to provide charging capability for the batteries. In addition, the USB connector 28 may provide digital signal connectivity between the circuit board 32 contained inside the housing and an external device (not shown) such as a cell phone or laptop computer. Digital connectivity may be used to monitor power consumption of the batteries, or to program a digital controller (e.g. within logic components 36) located on the circuit board 32 for custom functionality of the buttons and LEDs. The USB connector 28 may also be used to provide power from the flashlight batteries to an external device such as a cell phone.

In one embodiment, each LED 50, when illuminated, generates a resulting beam of light that has a nearly rectangular projected shape with an angular width Φ (in the X-Y plane) of approximately 45-50 degrees and a height (e.g. angular projection in the Z-Y plane or Z-X plane) of approximately 23 degrees. In this configuration, when all five LEDs 50 are simultaneously illuminated, the resulting combined illumination of the beams is a rectangular projected angular swath α of light that is approximately 225 degrees in width and 23 degrees in height. It is appreciated that the number of LEDs 50, and or shape, sizing or orientation of the optical elements 40 may be configured to cover any number of different configurations or ranges (e.g. projected angular swath α ranging from 120 degrees to 270 degrees or more, and more preferably between 180 degrees and 225 degrees).

The overlap angle β may be correspondingly small (e.g. 2 degrees to 5 degrees, or even one degree or less in some configurations), and configured to coincide at a specified distance from the flashlight corresponding to a particular expected range of distances (e.g. 10 feet-30 feet).

It is appreciated that the optical element shape/sizing and resulting beam patterns and illumination displayed in FIG. 5 through FIG. 9 are for illustrative purposes only, and may not be to scale or represent an exact angle or curvature. For example, such representations may be exaggerated so as to show up on illustration where they may not otherwise be perceptible.

Figure 6:
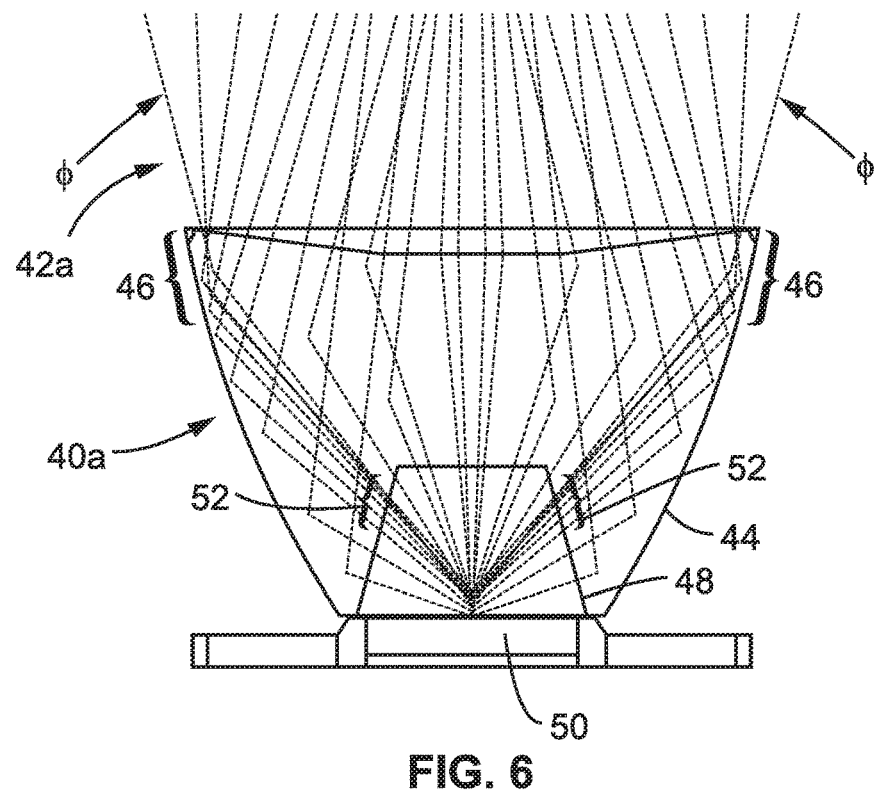
FIG. 6 is an alternative optical element configuration incorporating a Total Internal Reflection (TIR) lens configured to shape and/or disperse a rectangular beam.
Figure 8:
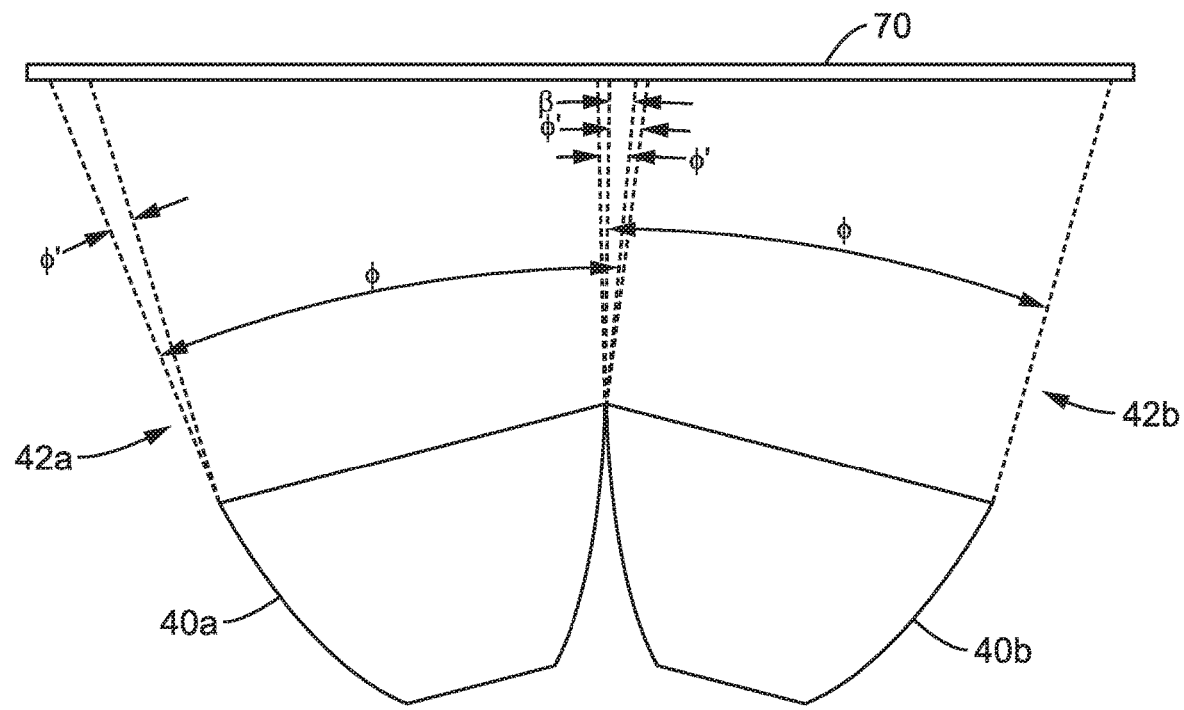
FIG. 8 shows a side view of two adjacent optical elements and resulting beam patterns in accordance with the present description.

FIG. 6 shows an alternative embodiment of an optical element 40a that comprises a Total Internal Reflection (TIR) lens configured to shape and/or disperse a rectangular beam 42a and specifically modified to provide substantially uniform light distribution across angular projection Φ, and having an intensity that tapers at a portion of the lateral edges of the beam. 42a. In this configuration, all light is internally modified (e.g. reflected, refracted, or dispersed) via one or more of internal surfaces 48 and external surfaces 44. Internal surfaces 48 and external surfaces 44 are preferably shaped to provide a mostly uniform distribution across the majority of angular projection Φ. However, one or more surfaces, (e.g. internal surface 52 or external surface 46) is shaped or otherwise modified (e.g. roughened, coated, painted, etc.) so as to reflect, refract or disperse light to taper the intensity at or near the overlap region 44 of two adjacent beams 42 (see taper region having angle Φ', as shown in FIG. 8). The taper region angle Φ' may vary depending on the desired taper profile, but may typically be in the range of 2 to 5 degrees.

Figure 7:
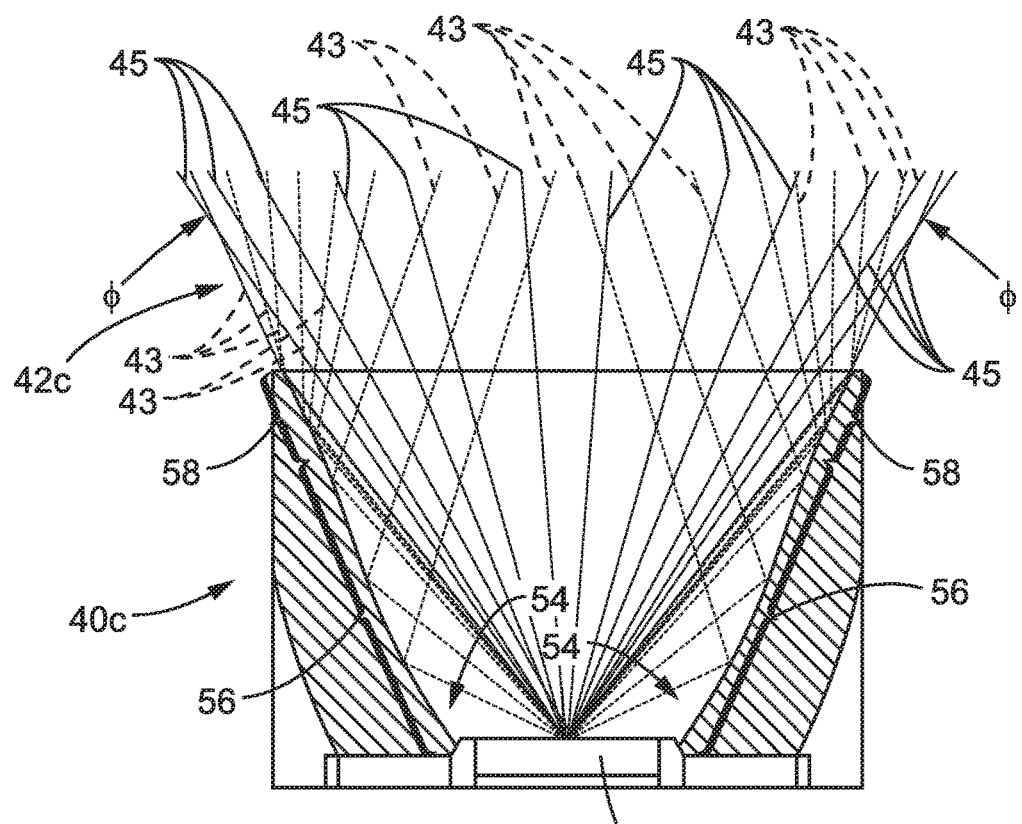
FIG. 7 is an alternative optical element configuration incorporating a reflector configured to shape and/or disperse a rectangular beam.

FIG. 7 shows an alternative embodiment of an optical element 40c that comprises a reflector configured to shape and/or disperse light uniformly across a beam 42c configured to generate a rectangular pattern of light when illuminating a planar surface. As seen in FIG. 7, light from LED 50 is emitted outward from a diverging cavity formed by the inner surface 54 of the reflector 40c, and may be in the form of direct light 45, or light 43 that is reflected off the interior reflective surface 54 of reflector 42c. The two side walls of reflective surface 54 are shaped so as to generate uniform light distribution across a substantial portion of the angular projection Φ of beam 42c (FIG. 7 shows the light distribution in the X-Y plane from left and right side-walls making up surface 54.

A similar structure of the internal surface 54 may be generated vertically for upper and lower side walls (not shown) so as to generate a uniform distribution in the X-Z plane). Lens 40a of FIG. 6 may similarly have a 4-wall structure for surfaces 44 and 48 of the lens. In one embodiment, the inner wall surfaces 54 comprise a square trumpet-like shape that comprise a compound curvature including a first concave inner surface 56 that focuses reflected light inward, and a convex outer surface 58 that distributes light outward toward the lateral edges of beam 42c. With respect to the cross-section of the array of LEDs when viewing the inner surface 54, the concave segment 56 at the center that transitions into the convex segment 58 toward the periphery of the reflector cavity 40c, which may seamlessly lead into the convex surface of the adjacent reflector cavity to form a somewhat sinusoidal surface about a half-radius.

It is appreciated that a portion of the curvature or surface 58 may be shaped, coated, etc. to provide an intensity taper region having angle Φ', as shown in FIG. 8.

FIG. 8 shows a side view of two adjacent lenses 40a and 40b commensurate with the lens embodiment shown in FIG. 6, along with resulting respective beam patterns 42a and 42b projected on a planar surface or wall 70. The lens 40a shown on the left in FIG. 8 is configured to comprise a taper of the emitted luminous intensity at angle Φ' from both peripheral edges of the beam 42a. Thus, this would serve to minimize overlap 44 "hot spots" by blending the output luminous intensity where two adjacent beams of light overlap and otherwise create a double brightness vertical band. Since the human eye generally requires 8 times the amount of light to perceive a brightness variation that appears to be double in brightness, any increase in luminous intensity due to the gradual overlap may be barely, if at all, discernible to the user.

Correspondingly, the outer-most optical element 40 in the array (see left-most and right-most optical elements 40 in FIG. 5) may only have a taper region Φ' on the inside edge of the beam 42b, as shown with lens 40b in FIG. 8 (in such case the reflector 40b is the right-most optical element in the array). This would have the effect of providing a sharp luminous intensity or bright line at the left and right edges of the combined beam pattern (e.g. at the furthest extent of the angular swath α, (see FIG. 5, see also FIG. 3 showing left-most optical element 40b disposed in the Y-axis)). While FIG. 5 shows all beams 42 from the array being identical, it is appreciated that some of the LED 50 or optical elements 40 may be distinct from another to achieve a slightly different beam configuration (e.g. beam swath Φ, taper, etc.). To save on production costs, the array of optical elements 40 may also be made identical to each other.

Figure 9:
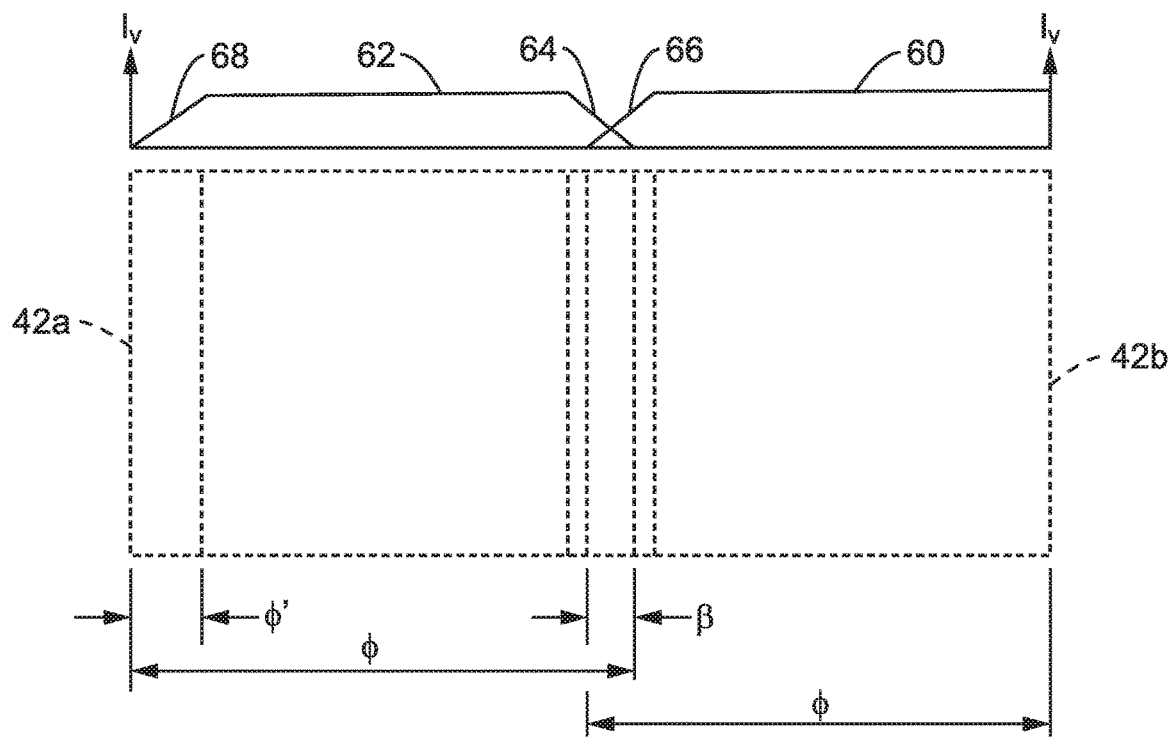
FIG. 9 shows the beams of the adjacent lenses of FIG. 8 projected on a planar surface (e.g. wall).
Figure 10:
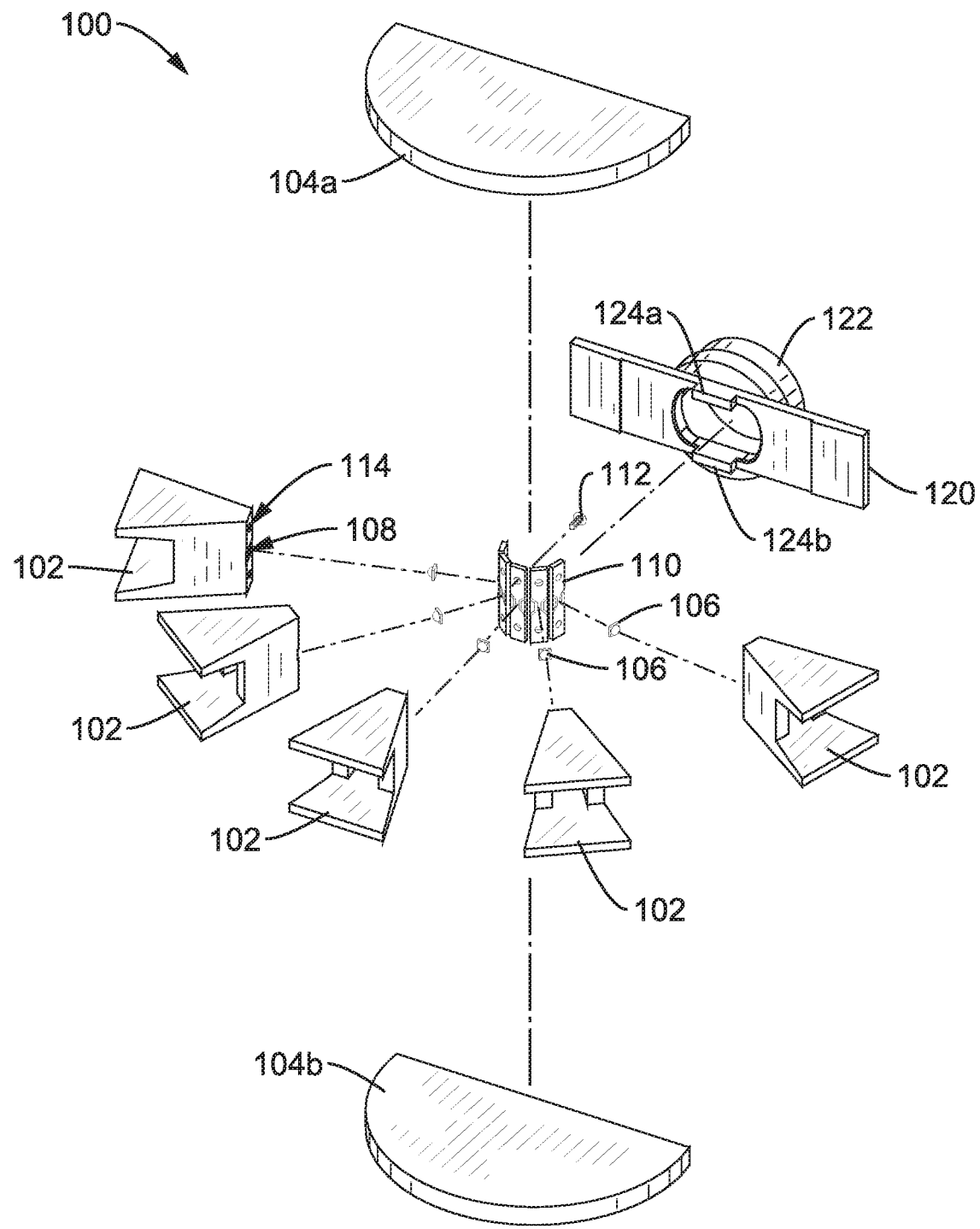
FIG. 10 is an exploded view of an embodiment of an optical head with five light shaping modules for a rectangular wide-beam flashlight in accordance with the present disclosure.
Figure 11:
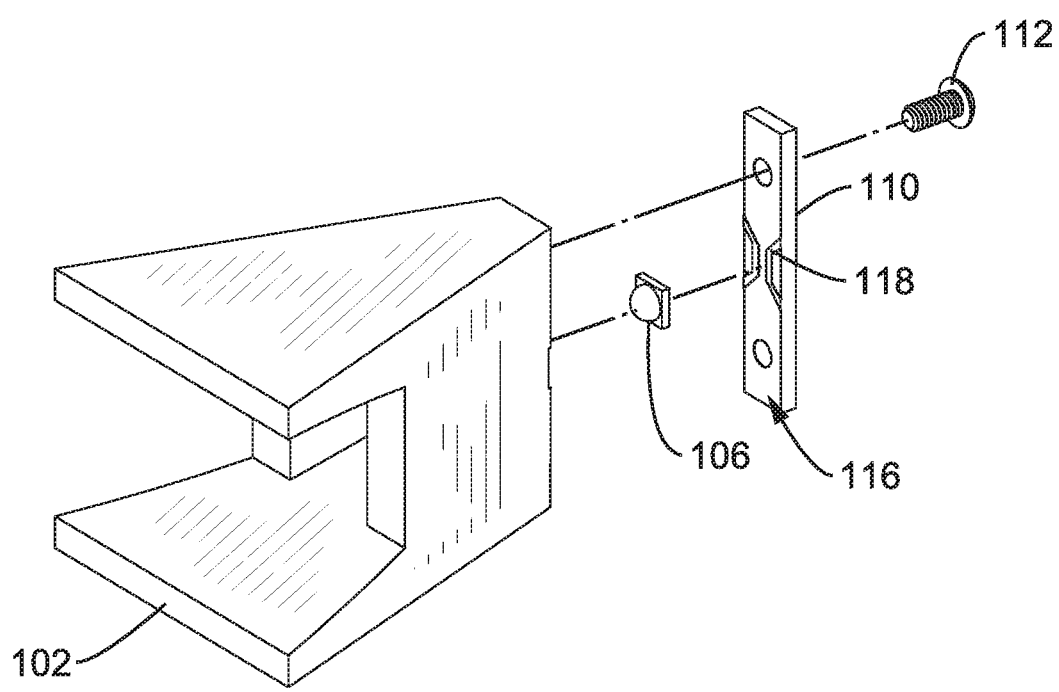
FIG. 11 is an exploded front perspective view of a single light shaping module according to an embodiment of the present disclosure.
Figure 12:
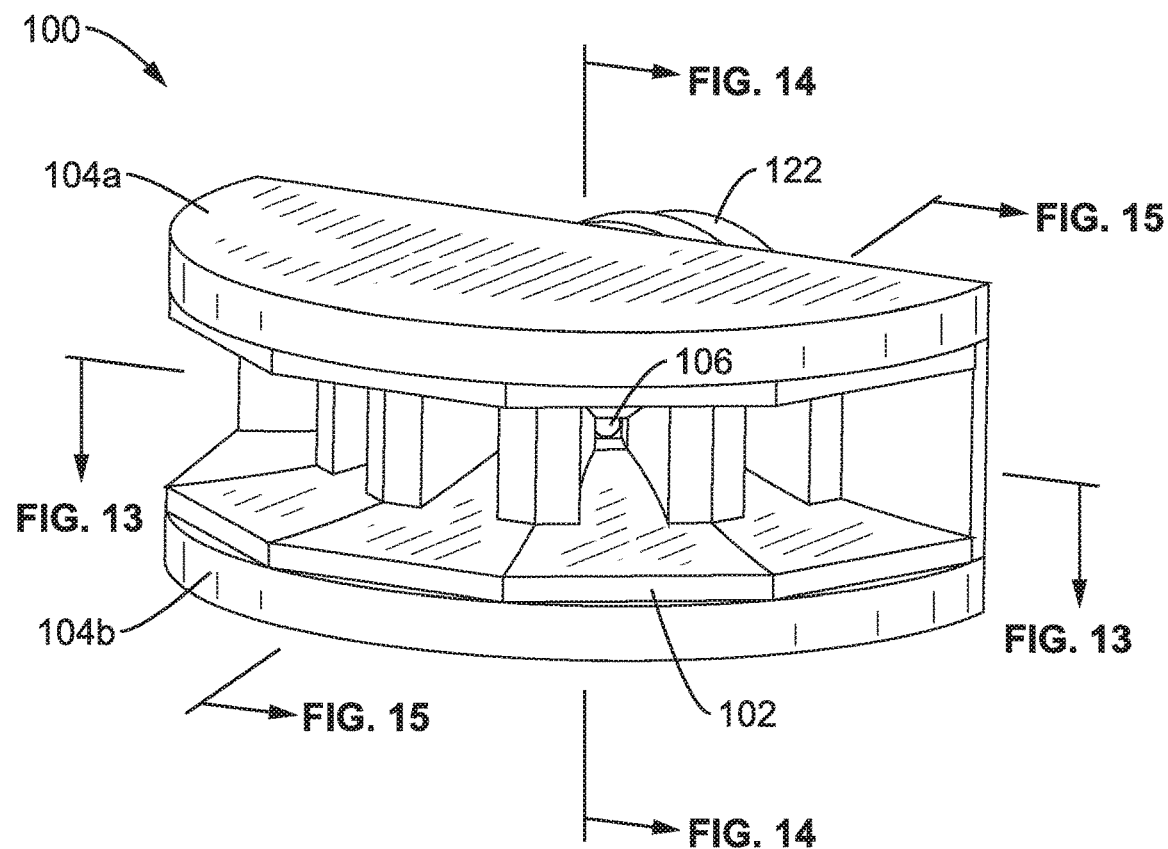
FIG. 12 is a front perspective assembled view of the optical head of FIG. 10.
Figure 13:
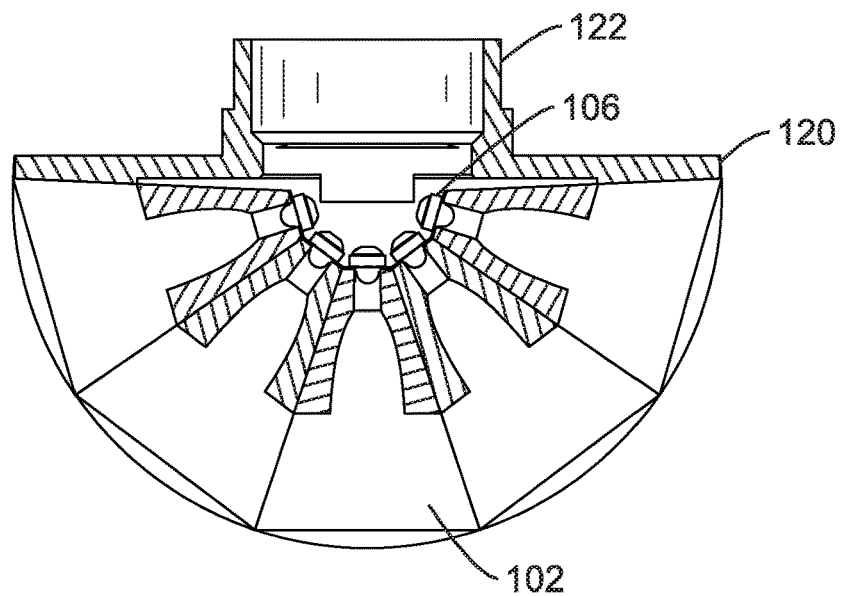
FIG. 13 is a top view of a horizontal full cross section of the optical head of FIG. 12 taken through lines 13-13.
Figure 14:
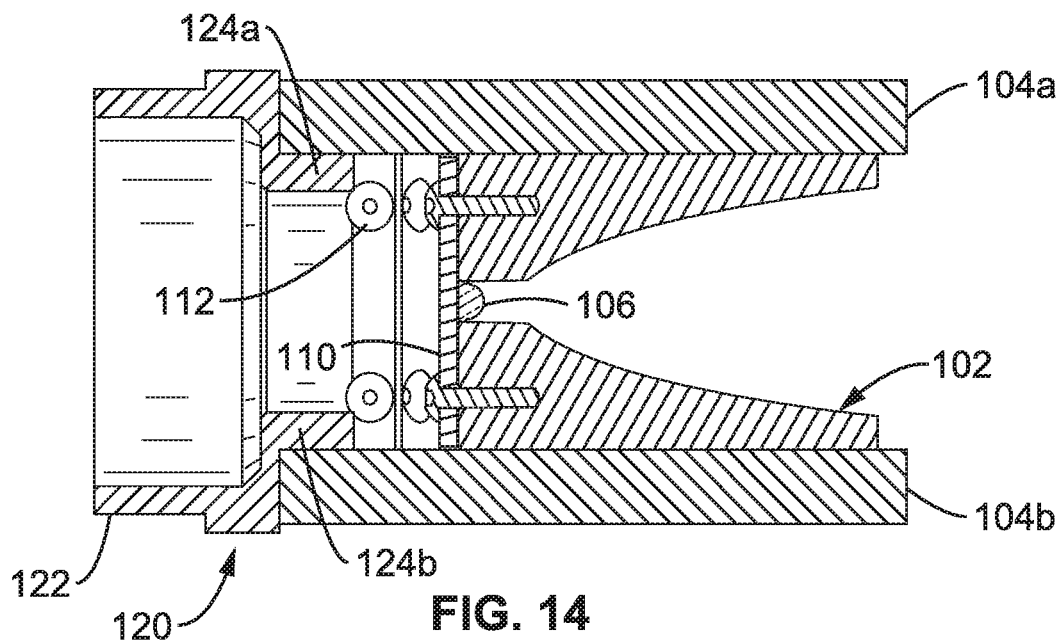
FIG. 14 is a side full cross section view of the optical head of FIG. 12 taken through lines 14-14.
Figure 15:
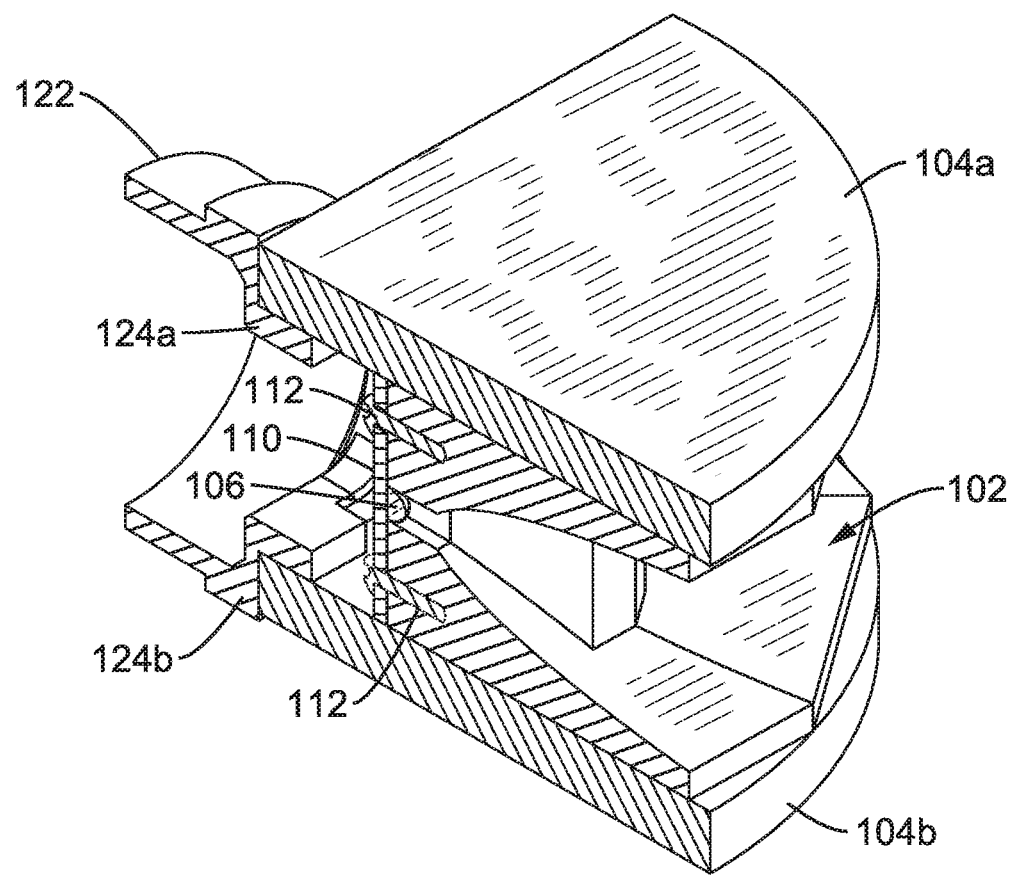
FIG. 15 is a perspective full cross section view of the optical head of FIG. 12 taken through lines 15-15.
Figure 16:
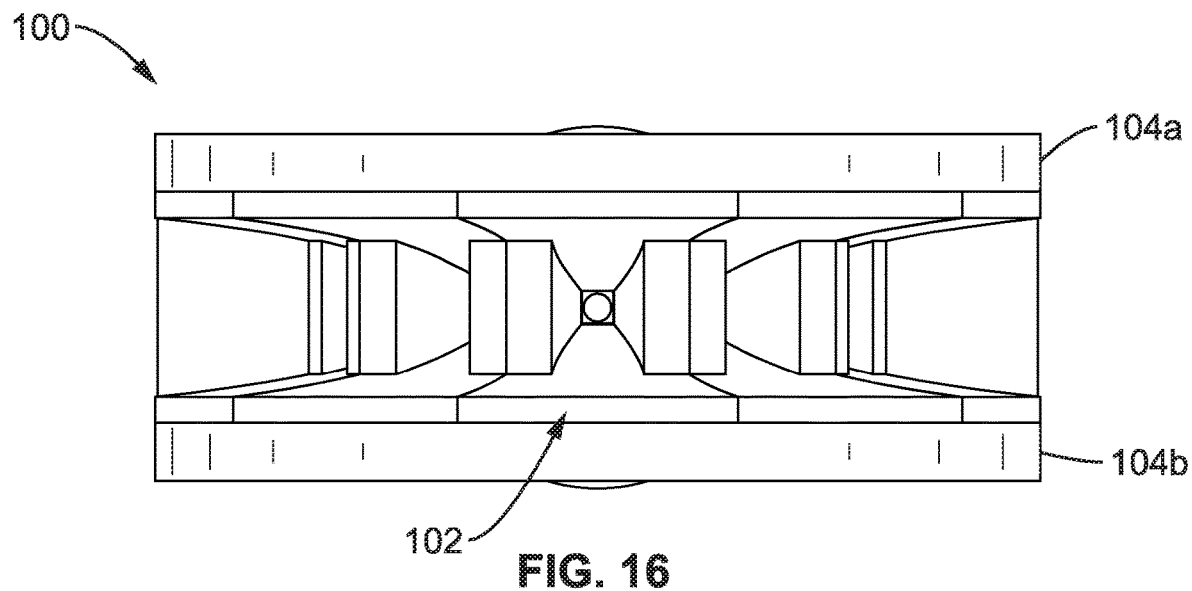
FIG. 16 is a front center view of the optical head of FIG. 12.

FIG. 9 shows the beams 42a and 42b of the adjacent lenses of FIG. 8 projected on a planar surface (e.g. wall 70) coincident with a graph of the luminous intensity $I_v$ at given angles within the X-Y plane. Both beams 42a and 42b have constant luminous intensity regions 60 and 62 $I_v$ through most of the beam swath Φ. Beam 42a has tapers 64 and 68 at both ends of a central region 62 having substantially uniform intensity, and beam 42b has a taper 66 at one end (adjacent beam 42a) of the substantially uniform intensity region 60 and no taper at the far end. The taper profiles shown in FIG. 9 are shown as linear curves that decrease from 100% intensity to 0% intensity within the taper region Φ'. However, many different taper profile configurations are contemplated, including variation in slope, curvature (e.g. parabolic) and grade (e.g. 50% taper at end of beam), tapers that are stepped, etc. It is further understood that the intensity values of the graph in FIG. 9 are representative for illustration purposes, and actual luminous output may have variations from that shown that may or may not be perceptible to the human eye.

It is appreciated that reflector 40c shown in FIG. 7 may be modified to provide the beam patterns 42c to have similarly tapered edges as shown in FIG. 8. Optical elements 40 may also comprise a combination of reflective, refractive, or dispersive optical elements to achieve the desired illumination pattern.

It is further appreciated that the overlap defined by angle β in FIG. 8 and FIG. 9 is preferably only configured to occur in the X-Y angular projection where beams are configured to overlap, as no tapering in the angular projection in the Z-Y plane or Z-X plane may be needed or desirable.

FIG. 10 through FIG. 16 illustrate an embodiment of an optical head 100 for a rectangular wide-beam flashlight in accordance with the present disclosure as an alternative to the optical head 12 previously described. In this embodiment, the optical elements comprise a plurality of light shaping modules 102 arranged side-by-side in an arcuate array. The light shaping modules are positioned between, and connected to, an upper retaining plate 104a and a lower retaining plate 104b. The retaining plates and light shaping modules may be connected together using any conventional means suitable for the materials used, such as, for example, holes and corresponding threads or other means with which screws, pins or other fasteners may used to securely connect the parts.

While smooth forward edges are shown on the retaining plates in this embodiment, toothed or serrated forward edges can be included as previously described. The figures and related description are primarily directed to the beam shaping and light emission characteristics of this embodiment.

Each light shaping module is associated with a corresponding light source 106 such as a Cree LED as previously described. Each light shaping module includes a rear opening 108 through which the light source can extend or through which the light source otherwise can project light. In this regard, each light source is preferably soldered or otherwise attached to a circuit board 110 which in turn is attached to the rear of the light shaping module. The circuit board can be attached to the light shaping module using any conventional means suitable for the materials used. For example, attachment may be made using screws, pins or other fasteners 112 that extend through the circuit board and into corresponding holes 114 in the light shaping module. Due to the heat generated by Cree LEDs, the circuit board preferably has a metalized surface 116 on the LED side to act as a heat sink. The light sources are preferably soldered to traces 118 on the circuit board, and plated through holes and traces or other connectors (not shown) can be provided for electrical connections to the light source.

A backing plate 120 with a coupling 122 is attached to the rear of the optical head. The coupling 122 is configured for connection to a support structure such as a handle of the type previously described. The backing plate includes upper and lower flanges 124a, 124b for attachment to the upper and lower retaining plates, respectively, using any conventional means suitable for the materials used, such as, for example, holes and corresponding threads or other means with which screws, pins or other fasteners may used to securely connect the parts. It will be noted that the backing plate also functions as a barrier to block rearward protection of light so that the emitted light has an approximate one-hundred and eighty degree field of projection.

Note that five light shaping modules are shown in the array as a non-limiting embodiment. Additional light shaping modules could be used when desired, such as when increasing the size of the array for use as a light bar on a vehicle. If fewer light shaping modules are used, the beam pattern would degraded even in a smaller array such as would be used in a handheld flashlight of the type described herein. Furthermore, multiple such arrays could be stacked.

In the embodiment shown, the array of light shaping modules is configured to shape and project light uniformly from the light sources into a pattern with relatively constant angular divergence in both the horizontal and vertical directions. The illumination pattern in the vertical direction is narrower than the pattern in the horizontal direction and this illumination pattern appears substantially rectangular in shape when projected onto a surface that is equidistant (spherical) from the light source.

Figure 17:
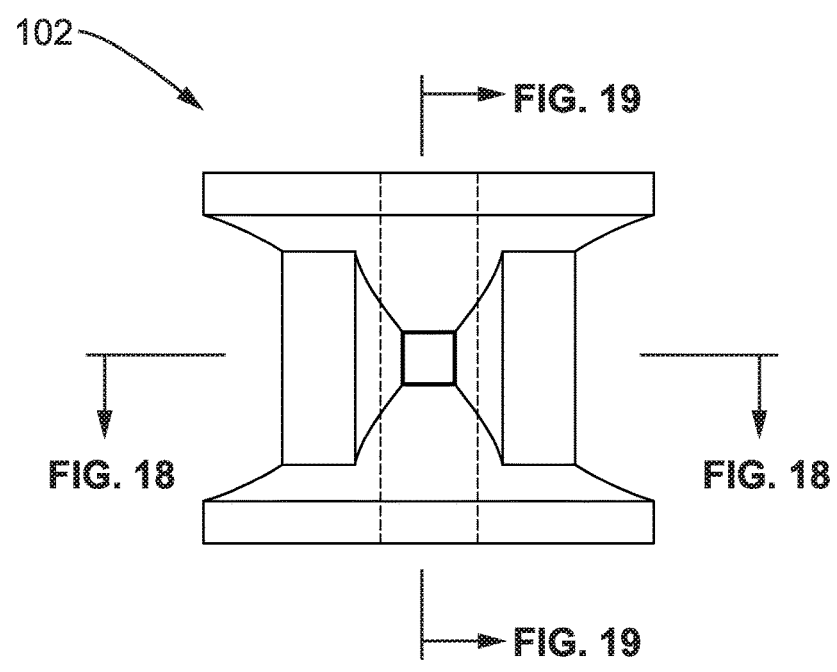
FIG. 17 is a front center view of an individual light shaping module according to an embodiment of the present disclosure.
Figure 18:
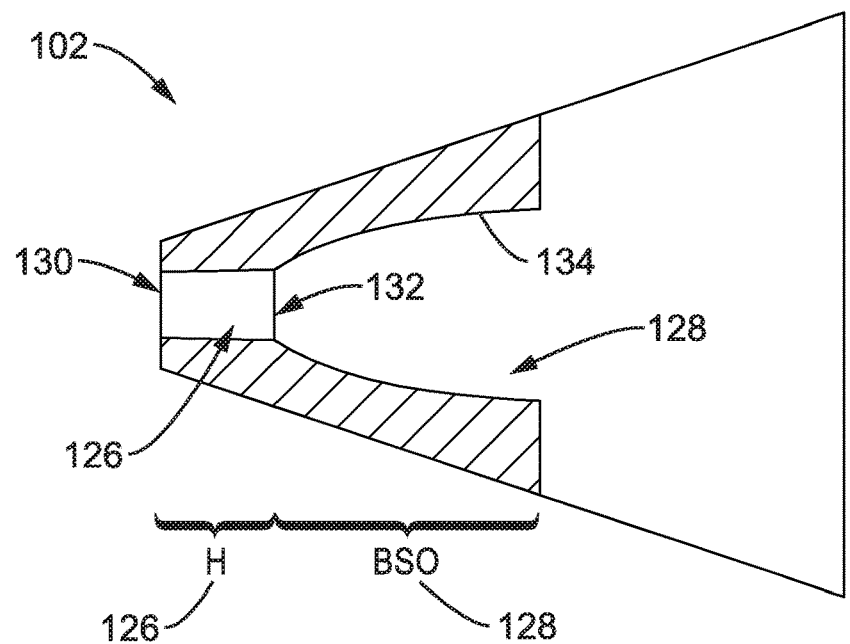
FIG. 18 is top view of a horizontal full cross section of the light shaping module of FIG. 17 taken through lines 18-18.
Figure 19:
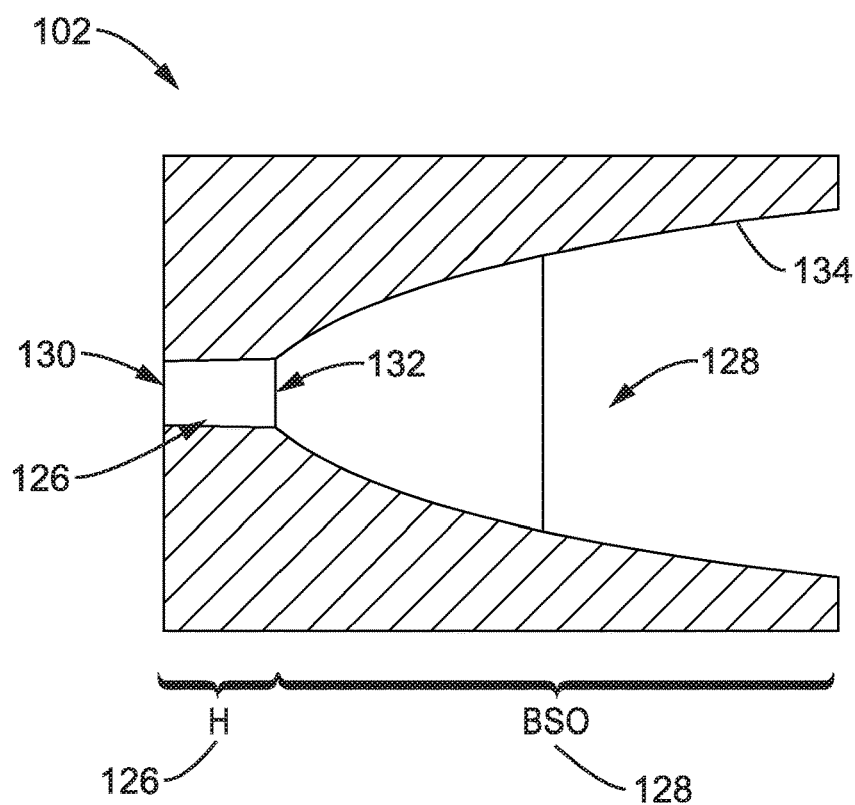
FIG. 19 is a side view of a vertical full cross section of the light shaping module of FIG. 17 taken through lines 19-19.

The configuration of a light shaping module in this embodiment is illustrated in more detail in FIG. 17 through FIG. 19. As illustrated, each light shaping module in this embodiment has two distinct sections: a homogenizer section (H) and a beam shaping optic section (BSO). The homogenizer section comprises a homogenizer 126. The beam shaping optic section comprises reflective surfaces 128 that are shaped to provide the desired beam forming and shaping characteristics. Each of these sections has different optical characteristics as will now be described.

The homogenizer collects light from the light source and generates a relatively uniform output surface that is rectangular in nature in order to condition the beam to be projected. In this embodiment the homogenizer has is a light pipe with a square input surface (face) 130 and a square output surface (face) 132. The non-uniform light collected by the light pipe at one end is transported to the other end of the light pipe by mirrored reflections in such a way as to homogenize the light. The length of the light pipe should be selected to achieve enough light bounces to homogenize the light intensity at the output end of the light pipe.

It will be appreciated that light pipes can be flat mirrored surfaces with input and output faces that are circular or of any polygon shape but are typically rectangular, square, hexagonal in shape. The sizes of the input and output faces can be different for the same light pipe, which will change the angular projection output of the light pattern. The light pipe can be straight or tapered.

The beam shaping optic receives light from the homogenizer and radiates the light in a substantially uniform rectangular projected pattern. In this embodiment, the beam shaping optic comprises a Concentric Parabolic Concentrator (CPC) that conditions and shapes the beam to be projected. The inner surfaces 134 of the beam shaping optic are mirrored so that the light that is projected outward comprises a combination of direct light and light that is reflected off the mirrored surface. Light is projected with a substantially uniform output over a controlled solid angle in the vertical and horizontal directions. The beam shaping optic can comprise various materials such as, for example, a metal material with a highly polished surface or a plastic material with a reflective coating common in the industry.

Figure 20:
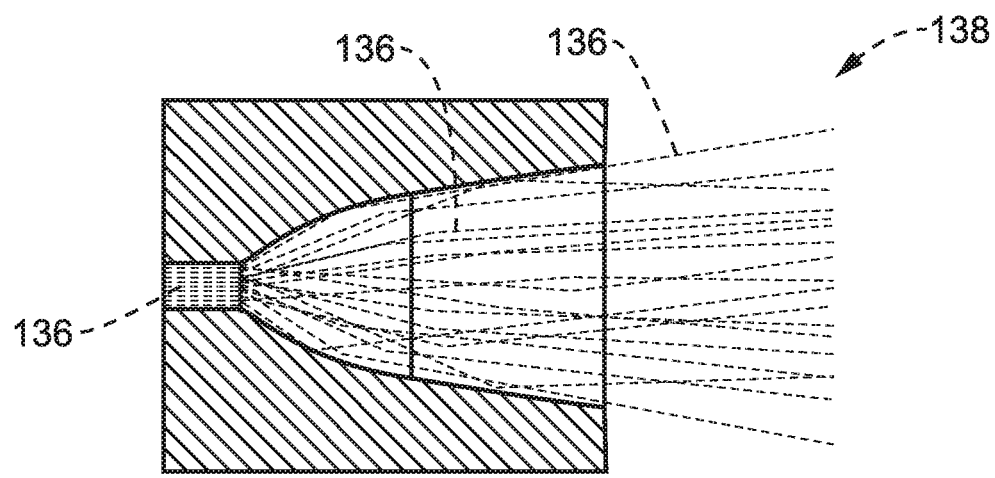
FIG. 20 is a ray pattern illustrating the narrow vertical pattern of light emitted from the optical head of FIG. 12.
Figure 21:
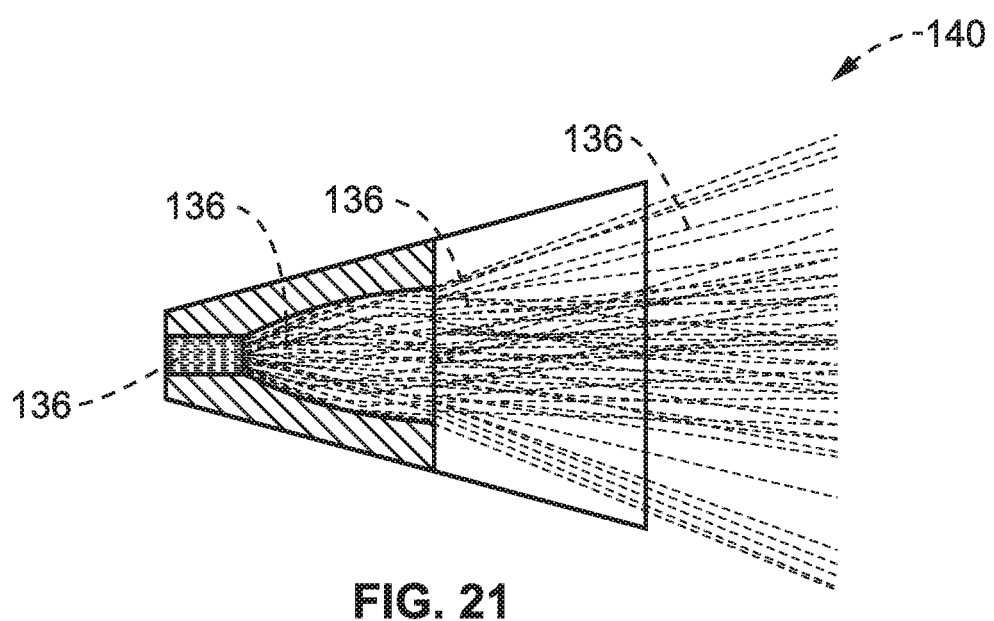
FIG. 21 is a ray pattern illustrating the wide horizontal pattern of light emitted from the optical head of FIG. 12.

As illustrated in FIG. 20 and FIG. 21, light rays 136 emitted from a light source are collected, homogenized and projected outward from the optics produced by the inner reflective surface of the beam forming optic, and comprises both direct light and light that is reflected off the reflective surface of the beam forming optic. The reflective surfaces are configured to collect the light and generate a relatively uniform projected light output over a controlled solid angle in the X-Z and Y-Z planes. FIG. 20 and FIG. 21 illustrate the narrow vertical pattern 138 of light rays (side view) and the wide horizontal pattern 140 of light rays (top view), respectively.

Figure 22:
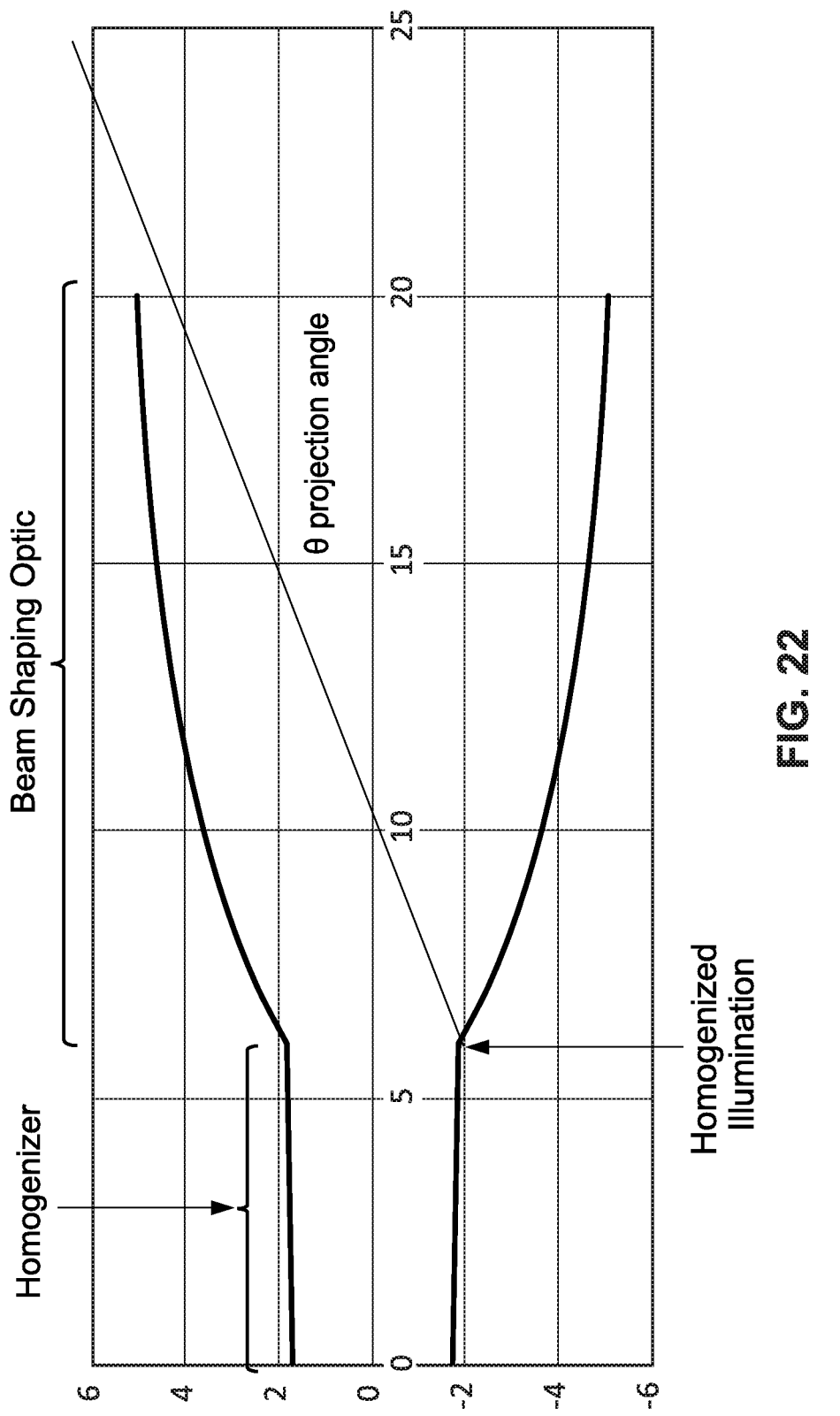
FIG. 22 is a diagram illustrating an embodiment of the relationship between the homogenizer and the beam shaping optic in the light shaping module of the present disclosure.
Figure 23:
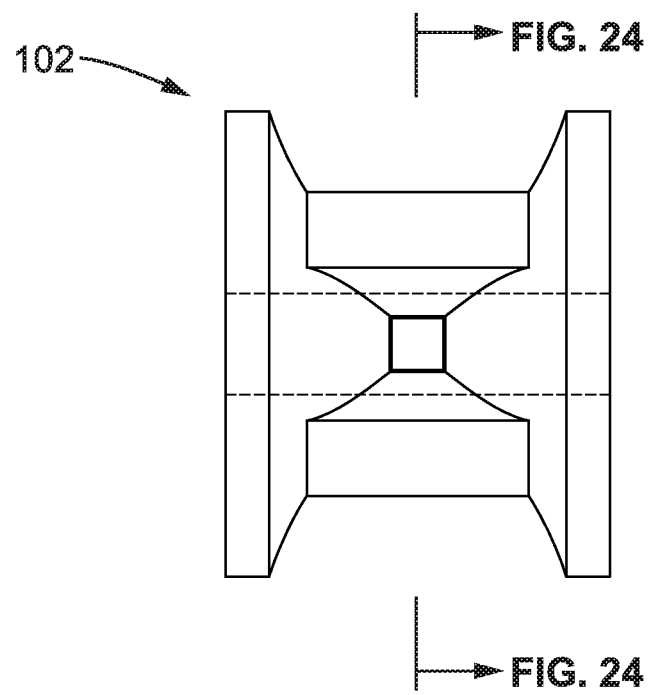
FIG. 23 is a center front view of the individual light shaping module of FIG. 17 rotated 90 degrees counterclockwise in relation to the view in FIG. 16.

FIG. 22 graphically illustrates the relationship between the homogenizer and the beam shaping optic. The homogenizer collects the light from the light source at one end (left side) and transfers it to a location at the other end (right side) where a relatively uniform illumination profile has been created. The beam shaping optic comprises reflective surfaces that project light entering at the small end (left side) of the optic to the large end (right side) of the optic. Ray angles are transformed to be projected from a large solid angle (wide angle with respect to the z-axis) to a smaller solid angle (narrow angle with respect to the z-axis) as it is reflected from the surfaces.

As described above, the basic shape of these types are optics are known as a Concentric Parabolic Concentrator (CPC). CPCs are described in detail in W. T. Welford and R, Winston, "High Collection Nonimaging Optics", Academic Press (1989), for example, and thus will briefly be discussed here.

For a hollow reflective optic where the internal surface is air, the maximum length of the CPC is given by:

$$L = \frac{a(1 + \sin\theta)}{\tan\theta \sin\theta}$$

where a=the entrance aperture and θ=maximum projection angle in the x or y directions.

The length can be truncated, but it will reduce the sharpness edge of the light beam. Shortening the CPC length can be used to increase the transition zone between the light and dark illuminated areas where beams overlap over lap from adjacent light patches.

The x or y coordinate (r) of points on the CPC as a function of the z coordinate along the axis is given by the positive real root of this quadratic equation:

$$C^2r^2+2(CSz+aP^2)r+(z^2S^2-2aCQz-a^2PT)=0$$

where C=cos θ, S=sin θ, P=1+S, Q=1+P, and T=1+Q.

Example 1

For an overall illumination pattern of 17 degrees by 180 degrees with 5 reflectors with a 5 degree overlap, an angle of +/−21 degrees is needed in the y-direction. For a=1.85 mm and θ=21 degrees, L=18.26765, C=0.93358, S=0.35837, P=1.35837, Q=2.35837, and T=3.35837. Solving for the positive real root to the quadratic equation for the x-direction gives the values in Table 1. The surface is truncated (z is less than the maximum length (L)) in order to control the overlap regions between adjacent reflector assembles so that a relatively uniform continuous beam is achieved. In the x-direction, the 17 degree projection angle gives θ=8.5 degrees, L=96.12594, C=0.989016, S=0.147809, P=1.147809, Q=2.147809, and T=3.14780. Solving for the positive real root to the quadratic equation for the y-direction gives the values in Table 2. The surfaces can be truncated in order to achieve the best compromise of collection efficiency and size.

Example 2

By way of example, and not of limitation FIG. 23 through FIG. 26 illustrate dimensional relationships in a light shaping module to achieve a rectangular wide beam according to the presented technology. Unless otherwise specified: (1) all dimensions and SAG table values are in millimeters; (2) all reflective surfaces are symmetrical around the Y and Z dimensions center lines; and (3) all reflective surfaces have less than about 7 microns deviation.

Figure 24:
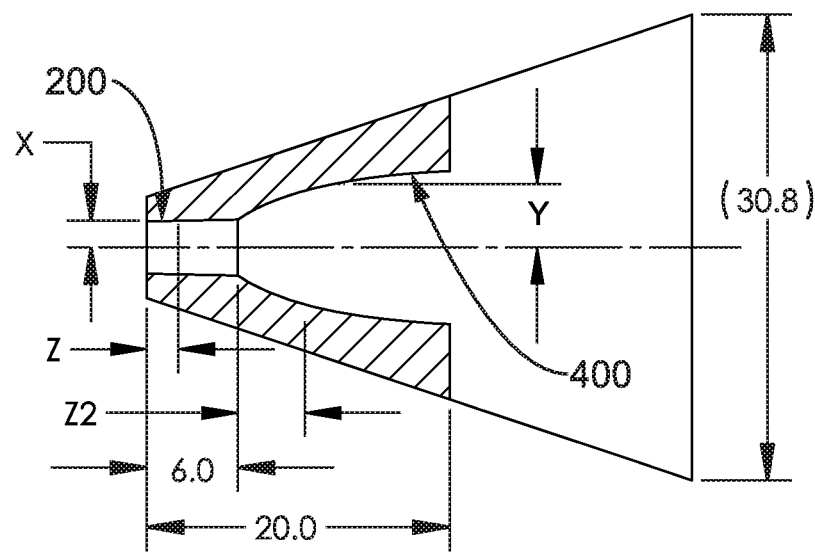
FIG. 24 is a side view of a vertical full cross section of the light shaping module of FIG. 23 taken through lines 24-24 of FIG. 23 with sample dimensions indicated.
Figure 25:
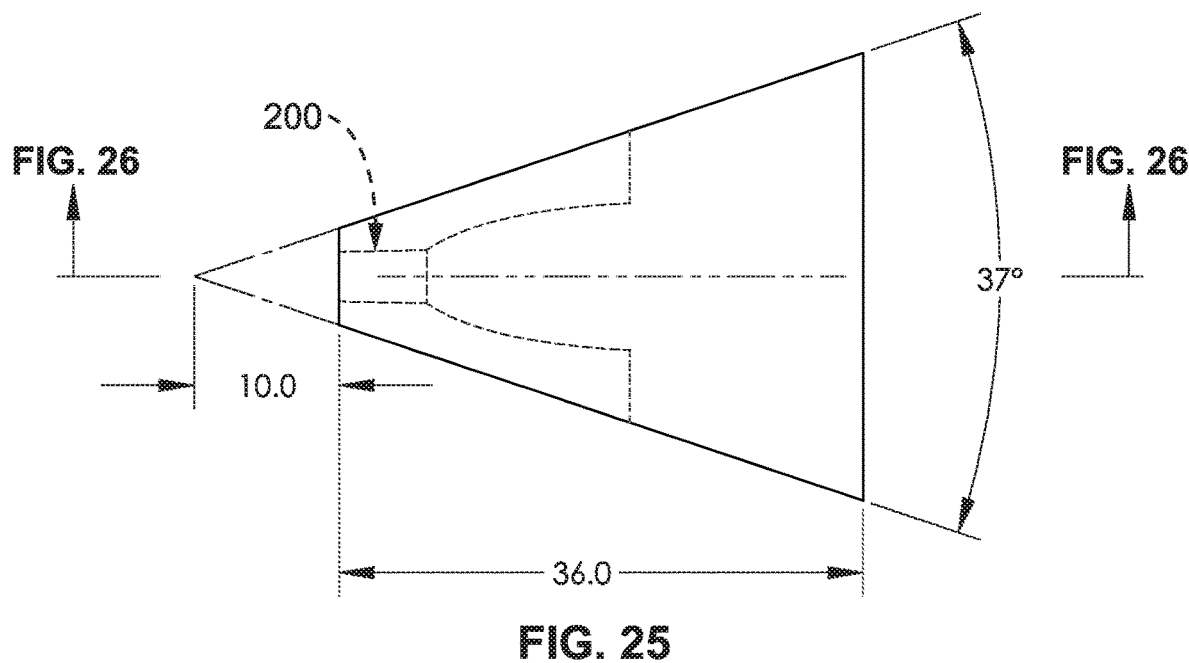
FIG. 25 is a top view of the light shaping module of FIG. 23 with sample dimensions indicated.
Figure 26:
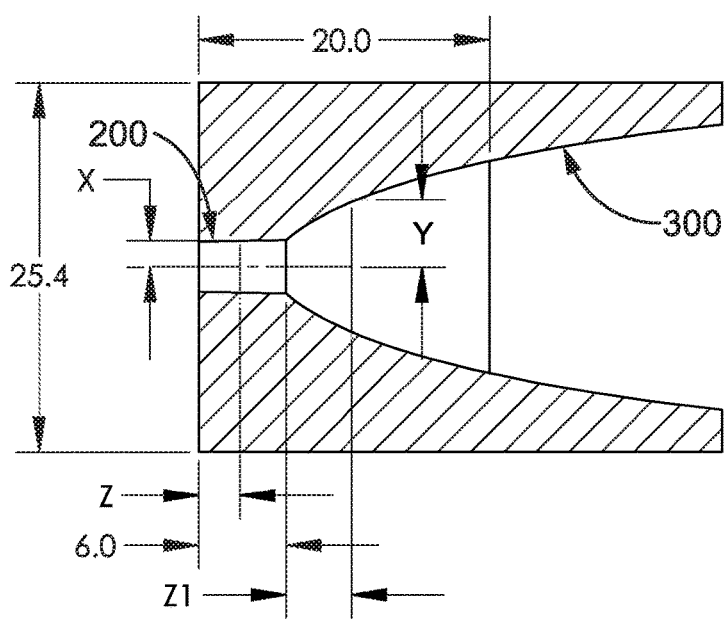
FIG. 26 is a side view of a vertical full cross section of the light shaping module of FIG. 25 taken through lines 26-26 with sample dimensions indicated.

In FIG. 24 and FIG. 26, the homogenizer reflective surface 200 is optically reflective at about 60 angstroms rms, and X=0.020833(Z)+1.725 where 0≤Z≤6. Table 3 and Table 4 are SAG tables showing the reflective surface contours 300, 400, respectively, for the beam shaping optic.

Surface 300 is optically reflective at about 60 angstroms rms and SAG Table 3 applies. The values in SAG Table 3 were determined according to:

For $0 \leq Z1 \leq 30$ $$Y = \frac{-b + \sqrt{b^2 - 4ac}}{2a}$$

where
a=0.978152378
b=0.292371705 (Z1)+4.874625844
c=0.021847622 (Z1)$^2$−7.859605043 (Z1)−12.36578432

Surface 400 is optically reflective at about 60 angstroms rms and SAG Table 4 applies. The values in SAG Table 4 were determined according to:

For $0 \leq Z2 \leq 14$ $$Y = \frac{-b + \sqrt{b^2 - 4ac}}{2a}$$

where
a=0.871572413
b=0.669130606 (Z2)+6.8271049
c=0.128427587 (Z2)$^2$−8.146386778 (Z2)−15.61310065

From the description herein, it will be appreciated that the present disclosure encompasses multiple embodiments which include, but are not limited to, the following:

1. A light projecting apparatus, comprising: (a) a housing configured to retain one or more power sources; and (b) an optical head extending from the housing, the optical head comprising: (i) a plurality of optical elements arranged in a sequential array; (ii) a plurality of light sources configured to be powered from the one or more power sources, each said light source disposed adjacent or within a corresponding one of said optical elements; (iii) each said optical element shaped to modify a beam of light emitted from a corresponding light source to generate a rectangular illumination pattern when projected on a planar surface; and (iv) wherein emitted light beams from adjacent optical elements overlap along at least one side of the emitted light beams such that adjacent light beams form a contiguous beam having a higher aspect ratio than each of the emitted light beams in isolation.

2. The apparatus of any preceding or following embodiment, wherein the optical elements are shaped to taper luminous intensity of each emitted light beam at a specified location corresponding to the adjacent beam overlap.

3. The apparatus of any preceding or following embodiment, wherein the light sources and optical elements are shaped to form a contiguous rectangular beam having an angular swath greater than 180 degrees.

4. The apparatus of any preceding or following embodiment, wherein each optical element comprises one or more surfaces that reflect, refract or diffuse light to taper the luminous intensity at a specified angle from peripheral lateral edges of the emitted beam of light to form an angular taper region at the lateral edges.

5. The apparatus of any preceding or following embodiment, wherein the one or more surfaces of the optical elements generate a central region between angular taper regions at the lateral edges, the central region comprising a substantially uniform distribution of luminous intensity.

6. The apparatus of any preceding or following embodiment, wherein at least one of the optical elements comprises a reflector having a concave segment and convex segment to distribute light substantially uniformly across the central region.

7. The apparatus of any preceding or following embodiment, wherein at least one of the optical elements comprises a lens shaped to direct light from a respective light source to form a total internal reflection (TIR) beam of collimated light at least across the central region.

8. The apparatus of any preceding or following embodiment, wherein the light sources comprise light emitting diodes (LEDs)

9. The apparatus of any preceding or following embodiment, wherein the light sources and optical elements are disposed in a radial array.

10. The apparatus of any preceding or following embodiment, further comprising a curved lens disposed opposite the LEDs from the optical elements to cover the light sources and optical elements.

11. The apparatus of any preceding or following embodiment, wherein the lens has a curvature configured to provide further dispersion of light.

12. The apparatus of any preceding or following embodiment: wherein the housing comprises an elongate first end for housing the one or more battery power sources and providing a handhold for a user, and said optical head at a second end for housing the light sources and optical elements; wherein the housing at the optical head comprises a surface for retaining a retractable bipod structure having a first folded position disposed flush with or retained in the housing and a second extended position that forms a pair of feet; and wherein upon placing the flashlight on a working surface with the bipod structure in the extended position, the pair of feet and first end of the housing form a tripod structure for securing the flashlight in a hands-free position and orienting the optical head upward at a specified angle with respect to the working surface.

13. The apparatus of any preceding or following embodiment, wherein the bipod structure comprises a hinge at one end and extends downward and outward in a lateral direction with respect to the optical head in the extended position.

14. The apparatus of any preceding or following embodiment, wherein the array comprises at least three light sources comprising a center light source and two peripheral light sources.

15. The apparatus of any preceding or following embodiment, wherein the light sources are coupled to a switch disposed within the housing, the switch having a first position where all light sources are off, a second position where only the center light source is on, and a third position where the center and periphery light sources are on.

16. The apparatus of any preceding or following embodiment:
wherein the array comprises at least five light sources comprising two outer peripheral light sources opposite the center light source from the peripheral light sources; and wherein the switch has a fourth position that illuminates the entire array of five light sources.

17. The apparatus of any preceding or following embodiment, further comprising a second switch that activates all of the light sources to strobe or flash one or more of the light sources.

18. A light projecting apparatus, comprising: (a) a housing configured to retain one or more power sources; and (b) an optical head extending from the housing, the optical head comprising: (i) a plurality of optical elements arranged in a sequential array; (ii) a plurality of light sources configured to be powered from the one or more power sources, each said light source disposed adjacent or within a corresponding one of said optical elements; (iii) each said optical element shaped to modify a beam of light emitted from a corresponding light source to generate a rectangular illumination pattern when projected on a planar surface; and (iv) wherein emitted light beams from adjacent optical elements overlap along at least one side of the emitted light beams such that adjacent light beams form a contiguous beam having a higher aspect ratio than each of the emitted light beams in isolation; (c) wherein the housing comprises an elongate first end for housing the one or more battery power sources and providing a handhold for a user, and an optical head for housing the light source; (d) wherein the housing at the optical head comprises a surface for retaining a retractable bipod structure having a first folded position disposed flush with or retained in the housing and a second extended position that forms a pair of feet; and (e) wherein upon placing the flashlight on a working surface with the bipod structure in the extended position, the pair of feet and first end of the housing form a tripod structure for securing the flashlight in a hands-free position and orienting the optical head upward at a specified angle with respect to the working surface.

19. A light projecting apparatus, comprising: (a) a housing configured to retain one or more power sources; and (b) an optical head extending from the housing, the optical head comprising: (i) a plurality of optical elements arranged in a sequential array; (ii) a plurality of light sources configured to be powered from the one or more power sources, each said light source disposed adjacent or within a corresponding one of said optical elements; (iii) each said optical element shaped to modify a beam of light emitted from a corresponding light source to generate a rectangular illumination pattern when projected on a planar surface; (iv) wherein emitted light beams from adjacent optical elements overlap along at least one side of the emitted light beams such that adjacent light beams form a contiguous beam having a higher aspect ratio than each of the emitted light beams in isolation; (v) wherein the optical elements are shaped to taper luminous intensity of each emitted light beam at a specified location corresponding to the adjacent beam overlap; (vi) wherein optical elements comprise one or more surfaces that reflect, refract or diffuse light to taper the luminous intensity at a specified angle from peripheral lateral edges of the emitted beam of light to form an angular taper region at the lateral edges; and (vii) wherein the one or more surfaces of the optical elements generate a central region between angular taper regions at the lateral edges, the central region comprising a substantially uniform distribution of luminous intensity.

20. The apparatus of any preceding or following embodiment: wherein the light sources and optical elements are disposed in a radial array; and wherein the light sources and optical elements are shaped to form a contiguous rectangular beam having an angular swath greater than 180 degrees.

21. The apparatus of any preceding or following embodiment, wherein the light sources and optical elements are shaped to form a contiguous rectangular beam having an angular swath greater than 220 degrees.

22. A optical head apparatus for a flashlight, comprising: (a) a plurality of optical elements arranged in a sequential array; (b) a plurality of light sources configured to be powered from one or more power sources, each said light source disposed adjacent or within a corresponding one of said optical elements; (c) each said optical element shaped to modify a beam of light emitted from a corresponding light source to generate a substantially rectangular illumination pattern when projected on a planar surface; (d) wherein emitted light beams from adjacent optical elements overlap along at least one side of the emitted light beams such that adjacent light beams form a contiguous beam having a higher aspect ratio than each of the emitted light beams in isolation.

23. A optical head apparatus for a flashlight, comprising: (a) a plurality of optical elements arranged in a sequential array; (b) a plurality of light sources, each said light source associated with a corresponding one of said optical elements; (c) each said optical element shaped to modify a beam of light emitted from a corresponding light source to generate a substantially rectangular illumination pattern when projected on a planar surface; (d) wherein emitted light beams from adjacent optical elements overlap to collectively generate a contiguous beam that forms a substantially rectangular illumination pattern which projected on a planar surface, wherein said contiguous beam has a higher aspect ratio than each of the emitted light beams in isolation.

24. The apparatus of any preceding or following embodiment, wherein each said optical element comprises a homogenizer section and a beam shaping optic section.

25. The apparatus of any preceding or following embodiment, wherein the homogenizer collects and conditions light from the light source.

26. The apparatus of any preceding or following embodiment, wherein the beam shaping optic section comprises reflective surfaces that receive light from the homogenizer section and radiate the light in a substantially uniform rectangular projected pattern.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| z | y |
|---|---|
| 0 | 1.8500 |
| 1 | 2.4529 |
| 2 | 2.9289 |
| 3 | 3.3172 |
| 4 | 3.6402 |
| 5 | 3.9120 |
| 6 | 4.1424 |
| 7 | 4.3385 |
| 8 | 4.5052 |
| 9 | 4.6468 |
| 10 | 4.7664 |
| 11 | 4.8664 |
| 12 | 4.9491 |
| 13 | 5.0162 |
| 14 | 5.0691 |
| 15 | 5.1092 |
| 16 | 5.1374 |
| 17 | 5.1547 |
| 18 | 5.1620 |
| 18.26765 | 5.1599 |

TABLE 2

| z | x |
|---|---|
| 0 | 1.8500 |
| 1 | 2.6153 |
| 2 | 3.2435 |
| 3 | 3.7823 |
| 4 | 4.2569 |
| 5 | 4.6825 |
| 6 | 5.0691 |
| 7 | 5.4237 |
| 8 | 5.7514 |
| 9 | 6.0561 |
| 10 | 6.3409 |
| 11 | 6.6081 |
| 12 | 6.8598 |
| 13 | 7.0975 |
| 14 | 7.3227 |
| 15 | 7.5364 |
| 16 | 7.7396 |
| 17 | 7.9333 |
| 18 | 8.1181 |
| 19 | 8.2947 |
| 20 | 8.4637 |
| 21 | 8.6256 |
| 22 | 8.7809 |
| 23 | 8.9299 |
| 24 | 9.0730 |
| 25 | 9.2105 |
| 26 | 9.3429 |
| 27 | 9.4702 |
| 28 | 9.5929 |
| 29 | 9.7111 |
| 30 | 9.8250 |

TABLE 3

SAG Table A

| Z1 | Y |
|---|---|
| 0 | 1.8500 |
| 1 | 2.6153 |
| 2 | 3.2435 |
| 3 | 3.7823 |
| 4 | 4.2569 |
| 5 | 4.6825 |
| 6 | 5.0691 |
| 7 | 5.4237 |
| 8 | 5.7514 |
| 9 | 6.0561 |
| 10 | 6.3409 |
| 11 | 6.6081 |
| 12 | 6.8598 |
| 13 | 7.0975 |
| 14 | 7.3227 |
| 15 | 7.5364 |
| 16 | 7.7396 |
| 17 | 7.9333 |
| 18 | 8.1181 |
| 19 | 8.2947 |
| 20 | 8.4637 |
| 21 | 8.6256 |
| 22 | 8.7809 |
| 23 | 8.9299 |
| 24 | 9.0730 |
| 25 | 9.2105 |
| 26 | 9.3429 |
| 27 | 9.4702 |
| 28 | 9.5929 |
| 29 | 9.7111 |
| 30 | 9.8250 |

TABLE 4

SAG Table B

| Z2 | Y |
|---|---|
| 0 | 1.8500 |
| 1 | 2.4529 |
| 2 | 2.9289 |
| 3 | 3.3172 |
| 4 | 3.6402 |
| 5 | 3.9120 |
| 6 | 4.1424 |
| 7 | 4.3385 |
| 8 | 4.5052 |
| 9 | 4.6468 |
| 10 | 4.7664 |
| 11 | 4.8664 |
| 12 | 4.9491 |
| 13 | 5.0162 |
| 14 | 5.0691 |

What is claimed is:

1. A light projecting apparatus, comprising:
   an optical head;
   a plurality of optical elements disposed within said optical head and arranged in a sequential array; and
   a plurality of light sources disposed within said optical head and respectively adjacent to said plurality of optical elements;
   wherein:
   each of said plurality of optical elements comprises a reflector having a concave segment and a convex segment shaped to modify a beam of light emitted from said respectively adjacent light source to generate a rectangular illumination pattern when projected on a planar surface;
   said illumination pattern comprises a central region having a substantially uniform distribution of luminous intensity and a taper region having a tapered luminous intensity; and
   said taper regions of adjacent illumination patterns overlap to form a contiguous illumination pattern having a higher aspect ratio than each of said adjacent illumination patterns in isolation.

2. The apparatus of claim 1, wherein at least one of said optical elements comprises a lens shaped to direct light from said respectively adjacent light source to form a total internal reflection (TIR) beam of collimated light at least across the central region.

3. The apparatus of claim 1, wherein said plurality of light sources and said plurality of optical elements are disposed in a radial array.

4. The apparatus of claim 1, further comprising a curved lens disposed so as to cover said plurality of light sources and said plurality of optical elements, wherein said lens has a curvature configured to provide further dispersion of light.

5. The apparatus of claim 1, further comprising:
   a bipod structure coupled to the optical head and having a first folded position disposed flush with or retained in said optical head and a second extended position that forms a pair of feet;
   wherein placing the said apparatus on a surface with said bipod structure in the extended position orients said optical head upward at a specified angle with respect to said surface.

6. The apparatus of claim 1, wherein said plurality of light sources comprises at least three light sources comprising a center light source and two peripheral light sources.

7. The apparatus of claim 6, wherein said at least three light sources are coupled to a first switch coupled to said optical head and having a first position where all light sources are off, a second position where only the center light source is on, and a third position where the center and periphery light sources are on.

8. The apparatus of claim 7: wherein said plurality of light sources comprises at least five light sources comprising two outer peripheral light sources opposite said center light source from said peripheral light sources; and wherein said first switch has a fourth position where said at least five light sources are all on.

9. The apparatus of claim 8, further comprising a second switch that activates all of said plurality of light sources to strobe or flash one or more of said plurality of light sources.

10. The apparatus of claim 1, wherein said overlapping taper regions have a combined luminous intensity that is substantially the same as said luminous intensity of said central region.

11. The apparatus of claim 10, wherein said plurality of optical elements and said plurality of light sources form a single contiguous rectangular illumination pattern having a substantially uniform distribution of luminous intensity.

12. The apparatus of claim 11, wherein said single contiguous rectangular illumination pattern has an angular swath of at least 120 degrees.

13. The apparatus of claim 12, wherein said angular swath is at least 180 degrees.

14. The apparatus of claim 12, wherein said single contiguous rectangular illumination pattern has a height of approximately 23 degrees.

* * * * *